(12) United States Patent　　　(10) Patent No.:　US 12,578,175 B1

Opperman et al.　　　(45) Date of Patent:　Mar. 17, 2026

(54) FLIGHT DECK UNIT AND SAFETY SUPERVISOR FOR ENHANCED NAVIGATION, FUZING, AND GUIDANCE OF UNMANNED VEHICLES OR PROJECTILES

(71) Applicant: Orbital Research Inc., Cleveland, OH (US)

(72) Inventors: Anthony Opperman, Wickliffe, OH (US); Douglas E Russell, Canal Fulton, OH (US); Frederick J Lisy, Euclid, OH (US); Scott Suren, Lakewood, OH (US)

(73) Assignee: Orbital Research Inc., Cleveland, OH (US)

( * ) Notice: Subject to any disclaimer, the term of this patent is extended or adjusted under 35 U.S.C. 154(b) by 379 days.

(21) Appl. No.: 17/975,743

(22) Filed: Oct. 28, 2022

Related U.S. Application Data

(60) Provisional application No. 63/273,211, filed on Oct. 29, 2021.

(51) Int. Cl.
　　*F42C 13/02*　　　(2006.01)
　　*B64D 7/02*　　　(2006.01)
　　　　　(Continued)

(52) U.S. Cl.
　　CPC ................ *F42C 13/02* (2013.01); *B64D 7/02* (2013.01); *B64U 10/13* (2023.01); *F42C 15/40* (2013.01);
　　　　　(Continued)

(58) Field of Classification Search
　　CPC ......... F42C 13/02; F42C 15/40; G05D 1/106; B64C 39/024; B64D 7/02; B64U 2101/60;
　　　　　(Continued)

(56)　　　　　References Cited

U.S. PATENT DOCUMENTS 9,085,362 B1 * 7/2015 Kilian ................ B64U 2101/16
9,524,648 B1 * 12/2016 Gopalakrishnan ... G08G 5/0069
　　　　　(Continued)

OTHER PUBLICATIONS

Reg Austin, Unmanned Aircraft Systems, 2010 (Year: 2010).*
　　　　　(Continued)

*Primary Examiner* — Erin D Bishop
*Assistant Examiner* — Shivam Sharma
(74) *Attorney, Agent, or Firm* — Brian Kolkowski

(57)　　　　　ABSTRACT
The present invention relates to navigation, fuzing, and guidance of vehicles, and more particularly to such capabilities for unmanned vehicles, drones, or other related systems. More particularly, the present invention is directed to a flight deck unit comprising sensors and electronics adapted to perform the navigation, fuzing, and/or guidance for such systems. Preferably, the flight deck unit is adapted for performing navigation, fuzing, and guidance in GPS denied or degraded environments and is immune to spoofing, jamming, and hacking, thereby providing safe and accurate navigation, fuzing, and guidance regardless of the arena or environment. Further, the invention is directed to a system for providing safety supervision of weapons systems on vehicles or projectiles. More particularly, the safety supervision is adapted for ensuring that weapon-level safety measures are unable to be disengaged while the vehicle or projectile is within a safety zone.

18 Claims, 4 Drawing Sheets

(51) Int. Cl.

| | |
|---|---|
| *B64U 10/13* | (2023.01) |
| *B64U 101/15* | (2023.01) |
| *B64U 101/20* | (2023.01) |
| *B64U 101/60* | (2023.01) |
| *F42C 15/40* | (2006.01) |
| *G01J 5/00* | (2022.01) |
| *G05D 1/00* | (2024.01) |

(52) U.S. Cl.
CPC ......... *G05D 1/106* (2019.05); *B64U 2101/15* (2023.01); *B64U 2101/20* (2023.01); *B64U 2101/60* (2023.01); *G01J 2005/0077* (2013.01)

(58) Field of Classification Search
CPC ............. B64U 2101/20; B64U 2101/15; G01J 2005/0077
See application file for complete search history.

(56) References Cited

U.S. PATENT DOCUMENTS

| | | | | |
|---|---|---|---|---|
| 10,155,587 | B1 * | 12/2018 | Tang .................... | G05D 1/0094 |
| 10,586,464 | B2 * | 3/2020 | Dupray .................. | G08G 5/26 |
| 2016/0223278 | A1 * | 8/2016 | Schechter ............ | F41A 17/063 |
| 2018/0150718 | A1 * | 5/2018 | Omari .................. | G01C 21/005 |
| 2018/0204469 | A1 * | 7/2018 | Moster .................... | G08G 5/34 |

OTHER PUBLICATIONS

Karol Hausman, Self-Calibrating Multi-Sensor Fusion with Probabilistic Measurement Validation for Seamless Sensor Switching on a UAV, 2016 (Year: 2016).*

Xiong, R.; Shan, F. DroneTank: Planning UAVs' Flights and Sensors' Data Transmission under Energy Constraints. Sensors 2018 (Year: 2018).*

* cited by examiner

FLIGHT DECK UNIT AND SAFETY SUPERVISOR FOR ENHANCED NAVIGATION, FUZING, AND GUIDANCE OF UNMANNED VEHICLES OR PROJECTILES

CROSS-REFERENCE TO RELATED PATENT APPLICATIONS

This application claims priority to Provisional U.S. Patent Application Ser. No. 63/273,211, which was filed on Oct. 29, 2021.

BACKGROUND OF THE INVENTION

1. Field of the Invention

The present invention relates to navigation, fuzing, and guidance of vehicles, and more particularly to such capabilities for unmanned vehicles, drones, or other related systems. More particularly, the present invention is directed to a flight deck unit comprising sensors and electronics adapted to perform the navigation, fuzing, and/or guidance for such systems. Preferably, the flight deck unit is adapted for performing navigation, fuzing, and guidance in GPS denied or degraded environments and is immune to spoofing, jamming, and hacking, thereby providing safe and accurate navigation, fuzing, and guidance regardless of the arena or environment. Further, the invention is directed to a system for providing safety supervision of weapons systems on vehicles or projectiles. More particularly, the safety supervision is adapted for ensuring that weapon-level safety measures are unable to be disengaged while the vehicle or projectile is within a safety zone.

The guidance and navigation aspects of the present invention involve combinations of one or more sensors capable of operating in GPS denied or degraded environments, and include one or more of infrared sensors, visual imaging sensors, radar, sonar, gyroscopes, accelerometers, magnetometers, and/or more preferably, one or more inertial measurement units (IMUs) comprising one or more of the above sensors. In many embodiments, combinations of multiple low-accuracy or low-resolution IMUs are utilized to provide high-accuracy or high-resolution location and guidance results while minimizing cost without sacrificing resolution or accuracy.

The fuzing aspect of the present invention involve systems adapted for arming and fuzing weapons systems of unmanned vehicles, drones, or systems. More particularly, the present invention includes arming and fuzing systems that ensure such weapons systems ae maintained in a safe state until the unmanned vehicle, drone, or system is either outside a designated "safe zone" or inside a designated "attack zone." The arming and fuzing systems are adapted to utilize similar combinations of sensors to determine when it is appropriate to arm and fuze the weapons systems, and to ensure that the weapons systems are not capable of being armed and fuzed until it is absolutely safe to do so.

2. Technical Background

Global Position Systems (GPS) have been a primary technology for Uidance, navigation and Control (GNC). GPS in combination together with one or more Inertial Measurement Units (IMU) generally enable very precise and accurate GNC along with location determination both absolute and relative to a target, even a moving target. Tactical grade IMUs with high performance accelerometers and gyroscopes allow for a robust navigation solution when the GPS signal is degraded. In weaponized systems, high accuracy GNC, even without GPS, allows for precise target strikes while reducing collateral damage. However, an increasing threat to such systems is jamming technologies, which can degrade or deny GPS, this rendering GPS-centric GNC systems effectively useless. Further, tactical grade IMUs are prohibitively expensive, rendering the GNCs systems expensive, adding to the already high cost of the larger vehicle or system as a whole. With respect to the threats of GNC signals being jammed, spoofed, or hijacked, RF Navigation spoofing means that a malicious RF signal is attempting to randomly or intelligently provide misleading timing and/or orientation data to the RF navigation receiver. Such spoofs can be subtle, confusing the system and leading it to calculate, for example, that it is a few dozen meters off, or more significant, confusing the system to calculate, for example, that it is on the other side of the world, and everywhere in between. More technologically sophisticated adversaries are capable of this approach. RF Navigation Jamming means that a malicious RF signal is attempting to overwhelm the receiver with otherwise useless information, thus blocking or significantly interfering with the desired signals. When higher power RF signals overwhelm the sensitive receiver chain, the navigation signals of interest are lost in the noise. Navigation, Fuzing, and Guidance systems can further be hacked or hijacked in various ways providing control of the system to the enemy who has hijacked the system. Jamming or spoofing signals are frequently located in terrestrial, fixed locations providing malicious signals to RF navigation systems from the ground. Initial improvements to RF navigation anti-jam and anti-spoofing hardware allows the RF receiver to sort out malicious signals from the desired signals to allow the system to effectively perform in these degraded environments. In the future, jamming and spoofing will not only occur from statically positioned sources below, but also from substantially parallel or above (for example, UAVs and satellites) and from dynamic sources. To continue to use an RF based navigation system in this environment, new methods are required to allow the RF receiver to steer around jamming and spoofing signals.

Therefore, it is an object of the present invention to provide precision guidance, navigation and control capabilities in GPS denied and/or degraded environments. It is a further object to provide such guidance in a more cost-effective manner, as well as in smaller form factors, including miniaturized, in order to increase the range of applications and ease of use. It is still further an object of the present invention provide fusing and arming safety control measures that ensure a weapons system is only armed when desired, and is unable to be armed within a safety zone, such as a range corresponding to the area of launch or near other landmarks where it is not desired to cause damage, particularly collateral damage. It is yet further an object of the present invention to provide a flight deck unit comprising sensors and electronics adapted for provided these improved and enhanced navigation, fuzing, and guidance capabilities, and preferably a modular, self-contained flight deck unit capable of being integrated into various platforms.

SUMMARY OF THE INVENTION

The present invention relates to navigation, fuzing, and guidance of vehicles, and more particularly to such capabilities for unmanned vehicles, drones, or other related systems. More particularly, the present invention is directed to a flight deck unit comprising sensors and electronics adapted to perform the navigation, fuzing, and/or guidance for such systems. Preferably, the flight deck unit is adapted for performing navigation, fuzing, and guidance in GPS denied or degraded environments and is immune to spoofing, jamming, and hacking, thereby providing safe and accurate navigation, fuzing, and guidance regardless of the arena or environment. Further, the invention is directed to a system for providing safety supervision of weapons systems on vehicles or projectiles. More particularly, the safety supervision is adapted for ensuring that weapon-level safety measures are unable to be disengaged while the vehicle or projectile is within a safety zone.

The present invention is an integrated solution for providing enhanced guidance, navigation and control (GNC) even in GPS denied or degraded environments while also providing fuzing and arming safety and control to avoid and overcome the rising threats of jamming, spoofing or hijacking guidance GNC of weaponized systems. The present invention is preferably able to be used with any type of vehicle or object that is at least partially in projectile motion, including, but not limited to, projectiles, munitions, missiles, and vehicles (manned or unmanned) for travel through the air, on the ground, or underwater, including unmanned aerial vehicles (UAVs)—either rotary or fixed body UAVs (including those classified in military groups 1 (weighing less than 21 lbs. and operating below 1200 ft. above ground level and at speeds of approximately 100 knots or less), 2 (weighing between 21-55 lbs. and operating below 3500 ft. above ground level and at speeds of approximately 250 knots or less), and 3 (weighing less than 1320 lbs. and operating below 18,000 ft. above mean sea level and at speeds of approximately 250 knots or less)), unmanned underwater vehicles (UUVs), or any other such vehicle commonly referred to as a "drone"), munitions, thrown projectiles, dropped projectiles, pneumatically launched projectiles, gun launched projectiles, magnetically launched projectiles, rocket launched projectiles, and the like. For the purposes of this application, any vehicle or projectile for which the present invention may be used or employed shall be referred to as "vehicle" or "projectile", or as "vehicle or projectile."

Many embodiments of the present invention utilize advanced IMU capabilities to provide, at least, highly accurate guidance and navigation, even in GPS denied or degraded environments. Such IMU systems are preferably comprised of low-cost IMUs that are arranged and combined in various configurations in order to provide the same, or even better, accuracy and reliability as high-cost tactical or navigational grade IMUs. Examples of such IMU systems are provided by U.S. Pat. Nos. 10,527,427, 10,969,226, and U.S. patent application Ser. No. 17/182,362 which was filed on Feb. 23, 2021, each of which is hereby incorporated by reference in their entirety, and each of which provides explicit detail on IMU systems employed in some embodiments of the present invention. Many embodiments of the present invention may also benefit from enhanced IMU processing techniques that provide enhanced resolution of IMU signal processing to enable continuous IMU measurements while avoiding saturation and data blackout periods resulting from changing conditions of the larger system. This again, allows a series of low-cost IMUs to provide equal, if not superior data collection capabilities and accuracy to that of high grade navigational or tactical IMUs. Examples of such IMU systems are provided by U.S. Pat. Nos. 10,527,425, 11,118,909, and U.S. patent application Ser. No. 17/395,570 which was filed on Aug. 6, 2021, each of which is hereby incorporated by reference in its entirety, and each of which provides explicit detail on IMU systems and signal processing employed in some embodiments of the present invention. Still further, many embodiments of the present invention may utilize such IMU systems that further include improved and enhanced error, offset, and drift correction which improves the accuracy even further by minimizing or correcting for shifts in sensor readings that occur over time. Examples of such IMU systems are provided by U.S. patent application Ser. No. 16/993,336 which was filed on Aug. 14, 2020, and which is hereby incorporated by reference in its entirety providing explicit detail on the methods and systems that can be used to provide correction of sensor errors and protection of low-cost IMUs to ensure high-accuracy functioning. Many embodiments of the present invention further include a recalibration module adapted to address sensor error, offset, or bias shift caused by the randomness of bias shifts accrued during operation of the system and sensors, which is also explained in detail in U.S. patent application Ser. No. 16/993,336. Preferably, the GNC capabilities of the present invention are performed, at least in part, by an IMU system comprising multiple IMUs operating in conjunction with each other to result in high bandwidth and full coverage of the angular rate and linear acceleration, where the multiple IMUs comprise a) several sensor types and ranges, b) arrayed and arranged to reduce bias, noise, and temperature drift, and to allow multiple small IMUs, strategically packaged together, to enable the resultant system to meet virtually all performance levels of performance standards while fitting into a small, low power package.

The present invention includes an arrangement of multiple miniature IMUs in a single package or sensor suite that can meet or exceed the performance of tactical or navigational guidance IMUs, and can further provide guidance in GPS denied and/or degraded environments. The guidance system of the present invention is largely focused on a sensor suite consisting of multiple accelerometers, gyroscopes and optionally magnetometers that fit within a small or miniaturized form factor, for example a 1.5 cubic inch package, or preferably smaller. The sensor 10 suite may comprise one or more individual IMUs, though preferably more than one. One exemplary IMU system of the present invention preferably conforms to, or exceeds, accelerometer and gyroscope requirements as defined in Table 1.

TABLE 1

| Accelerometer and Gyroscope Preferred Operating Ranges and Parameters | | |
| --- | --- | --- |
| | Minimum Preferred | Obtained Performance |
| Accelerometers | | |
| Dynamic Range (g) | ±150 | ±150 |
| Bias, Turn on (mg) | <10 | <2 |
| Bias, In-run (mg) | 0.5 | <0.14 |
| Scale factor (%) | 0.1 | <0.02 |
| Velocity Random Walk | 0.04 | 0.04 |
| Bandwidth | >70 | >70 |
| Gyros | | |
| Dynamic Range (°/s) | ±36K & ±2000 | >±36K & <±2000 |
| Bias, Turn on (°/s) | <0.028 | <0.02 |
| Bias, In-run (°/s) | <0.1 | <0.0017 |
| Scale factor (%) | <0.035 | <0.035 |
| Angle Random Walk (°/√hr) | <0.1 | <0.1 |
| Rate Random Walk (°/Hr/√hr) | <1 | <1 |

TABLE 1-continued

| | Accelerometer and Gyroscope Preferred Operating Ranges and Parameters | |
|---|---|---|
| | Minimum Preferred | Obtained Performance |
| bandwidth (Hz) | >70 | >315 |
| Misalignment (mr) | <3 | <3 |
| G-sensitivity (°/s/g) | <0.05 | <0.0002 |
| | Overall Requirements | |
| High G - Launch Env, (g) | 50,000 | 65,000 |
| Temperature Range (° C.) | −55 to 140 | −55 to 140 |
| Power (Watt) | <1 | <1 |
| Volume (in³) | <0.5 | 0.4 |

One distinct advantage of the IMU portion of present invention is the packaging of multiple IMUs within a single package, housing or body. The present invention further employs a sensor fusion algorithm that uses all available sensor data, and with this fusion algorithm, the sensor suite is able to create a single high performance IMU that performs as if a single tactical or even navigational grade device. This present invention further employs a combination of low-cost, or even ultra-low-cost IMUs, or a combination of ultra-low-, low- and mid-range IMUs that individually have much lower accuracy and resolution, however after using statistical fusion techniques, the overall sensor suite will exhibit increases in measurement performance that is provided as output to other GNC systems or subsystems. More specifically, in one preferred embodiment, the present invention utilizes multiple low-accuracy or low-resolution IMUS in combination with at least one mid- or even high-accuracy or mid- or high-resolution IMUs, and combines them within a single structural framework, in order to create a single sensor-fused IMU unit that operates with highly accurate (such as tactical or navigation grade) location and guidance. The present invention may also include a combination of high cost and high performance/range/accuracy IMUs which too will benefit from the strategic arrangement and placement to increase the measurement performance of the IMU.

Various embodiments of the IMU sensor suite preferably include multiple sensor devices that are integrated together through a microcontroller to perform processing in order to supply output data at acceptable format/rate/range/resolution. These acceptable specifications or requirements may vary based on the application, but for most preferred embodiments, the goal is to achieve at least tactical grade navigation and or guidance, and more preferably navigation grade. Exemplary tactical grade navigation or guidance exhibits an angular random walk (ARW) of about 0.002°/√hour. Exemplary navigation grade navigation or guidance exhibits an ARW of about 0.07°/√hour. In order to meet dynamic range requirements for PGMs (potentially+/−40 g accelerometer, 300 Hz spin); various embodiments of the present invention preferably employ the spatially orientated IMUs around the circumference of its electronic boards within the multi-IMU package. These sensors (preferably at least accelerometers) provide measurement data that can be used to attain angular acceleration and ultimately angular motion estimates. For example, consider an object moving in a circle of radius r with constant angular velocity. The tangential speed is constant, but the direction of the tangential velocity vector changes as the object rotates. Multiple accelerometers at different radii can be used to separate linear acceleration from centripetal acceleration and solve for rotational speed using a processor. Some embodiments preferably include sensors comprising accelerometers and gyroscopes. Depending on the environment and conditions, the low-end gyroscopes may become saturated and unable to provide accurate measurements. Some embodiments enable the system to use the gyroscopes when the rotational speed is within their range of measurement and use the accelerometers when the rotational speed is beyond the range of the gyroscopes. Some embodiments of the multiple IMU sensor suite may include a magnetometer as part of at least some of the individual low-end IMUs. The magnetometer may be any type known and available to those skilled in the art, or may be of the type described in U.S. Pat. No. 10,895,611 and in U.S. patent application Ser. No. 17/120,731 which was filed on Dec. 14, 2020, which are hereby incorporated by reference in their entirety and which describe in great detail an enhanced magnetometer that may be used in the present invention. The increased number of IMUs within the present invention provides increased measurement performance as well as the ability to isolate failures or offsets in sensors. Effectively, each individual IMU provides a redundant measurement which allows for calibration, error correction and enhanced accuracy. The configuration of the IMUs of the present invention employs an innovative parallel communication strategy that enables the microcontroller to collect and process data efficiently in order to meet internal and external deadlines associated with commands necessary for the PGM navigation. A parallel data bus may be employed in various embodiments and is used to provide identical communication between several IMUs and the microcontroller. A common clock enables data communication to be processed in parallel in the firmware through bit banging, reading the whole I/O port and all IMU data on the bus. Simple matrix manipulation allows for the bit matrix to be delivered to sensor fusion algorithms in the correct format.

The advantages of the design of the multi-IMU sensor suite of the present invention include the ability to reject stochastic errors within the architecture. Averaging the measurement across all IMU devices gives:

$$s_k = \sum_i \frac{1}{N} s_k^{-i} = s_k^i \sum_i \frac{1}{N} v_k^j \qquad \text{Equation 1}$$

Using this mean along with the variance of the estimate, s, allows for reduction of the sensor error noise. Using an adaptive weight on each sensor based on a voting scheme, the IMU gains can be manipulated to continue to reduce the measurement errors, without incurring latency penalties. Another benefit of the multi-IMU prototype is the ability to reject and isolate failed sensors. If an IMU or component with an IMU fails, this failure can be detected and isolated/rejected from inclusion in the ultimate navigation solution.

The data redundancy provided by measurement from each of the individual IMUs can also be exploited by leveraging the similarity of each IMU, preferably while also taking into account any differences between them, such a based on relative and absolute position of each IMU on the multi-IMU system. By placing the IMUs at different rotations, drifts in measure due to time and temperature tend to cancel when the measurements of separate IMUs are combined. The IMUs that are part of the multi-IMU preferably have configurable dynamic ranges and resolutions. Additionally, the multi-IMU may have, in some embodiments, IMUs with different configurations to give a more robust measurement package. By having different dynamic ranges, the multi- IMU is able to measure over extended flight conditions without increased noise in the package. The redundancy is also beneficial to allow the multi-IMU to provide spatial and temporal diversity. By distributing the IMUs on both sides of the board and around the printed circuit board (PCB), different sensors can be used to gather high resolution data while at extreme flight conditions. A key case for the redundant measurement is that of high spin: the gyroscopes can be situated and configured to give high resolution data at lower spin rates, while accelerometers placed intelligently around the edge of the PCB will provide rotational measurement at very high spin rates (300 Hz+ depending on placement).

Temporal diversity within the scope of the present invention pertains to the ability of the multi-IMU to configure and communicate with individual IMUs and enhance the data output. For example, the multi-IMU is able to sample data asynchronously, and use the microcontroller and advanced timers to fuse the data and provide an effective sampling rate that is much higher than the specified rate of each individual sensor. Through the multi-IMU firmware, the overall sensor suite is capable of weighting the correct sensor as the mission/flight dictates. When maneuvers and/or rocket subsystems engage or actuate, the electronics are able to provide the handshake between high-range sensors and low-range sensors so that the system can accurately capture the motion of the projectile in order to maintain accurate navigation solutions. This redundancy in sensor(s) also serves two other beneficial purposes. First, significant increase in precision with the customized higher grade IMU but in a reduced sensor range (+/−16 G, 2,000 dps) can be achieved. The firmware is designed to adaptively switch between the higher grade IMU and the multiple low cost IMUs at the onset of saturation of each of the sensor's dynamic range. Second, this redundancy allows for an overdetermined system when used to estimate the state/orientation of the projectile. The outputs provided by the additional sensors are always available for the enhanced Kalman Filter (EKF) so that a robust, consistent solution will exist based on sensor suite outputs. As the main GNC suite, the present invention leverages a customized package of the higher grade IMU and multiple lower cost IMUs to reduce footprint, increase capabilities and meet the volumetric constraints of the projectile(s) to be cross-platform compatible.

Further, various embodiments of the present invention preferably include a handshake feature whereby various groups or subgroups of individual IMUs are utilized at different times or under different conditions, and the system provides a handshake command such that one group or subgroup of IMUs hands off monitoring and measurement functions to a different group of subgroup of IMUs. Such feature enables the system to use a configuration of sensors that provides a large dynamic range with a lower level of resolution when conditions are best served by such sensors, and for the system to switch to a configuration of higher resolution sensors with a lower dynamic range when such a configuration would benefit the system's operation. For example, in a guided projectile that is in the midst of a long-range path of travel that requires little maneuvering, an individual IMU, group, or subgroup of IMUs can be used that exhibits large dynamic range with lower resolution because the projectile requires little instruction in the way of maneuvering commands. However, as such projectile approaches its target, which may very well be a moving target, the system preferably switches to an individual IMU, group or subgroup of IMUs that exhibit higher resolution with a lower dynamic range, where the higher resolution gives the projectile more accurate and rapid control of sudden and precise maneuvers and movements. Many combinations of IMUS, groups and subgroups of IMUs can be envisioned, and re incorporated within the scope of the invention, by way of non-limiting example, IMU groupings covering particular flight conditions that are known to be particularly useful for flight of a particular system, IMU groupings where adjacent ranges of conditions are predefined and measured by each group of IMUs, overlapping ranges of conditions whereby each grouping of IMUs is used in a particular range of conditions where the ranges overlap and redundancy is provided by measuring with multiple groups of IMUs, or combinations of the above.

The modular flight deck unit preferably combines two or more types of sensors to provide the robust navigation, fuzing, and guidance capabilities that enable the vehicle or projectile to operate in the most accurate and safe way possible. The system is designed to employ and leverage both sensor diversity and spatial diversity in its sensor measurements. Spatial diversity refers to the use of specific geometric arrangements of sensors to observe the dynamics of a platform to which they are fixed to yield higher quality measurements of those dynamics. This principle allows for the use of lower cost and smaller sensors to be used for more challenging applications. It allows for the reduction of manufacturing bias and increased observability to create more robust measurements. Sensor diversity refers to the use of specific combinations of different types of sensors that utilize different sensing physics to provide additional observability and robustness to the measurement. Inertial sensors refer to sensors such as accelerometers (measuring linear accelerations), gyroscopes (measuring angular velocity), and the like. Magnetic sensors generally refer to magnetometers (primarily of the fluxgate configuration, but also magneto-resistive, magneto-inductive, or hall effect type). GPS refers to global positioning system navigation systems both civilian and military. Pseudolites (pseudo-satellites) refers to the class of instruments that can be placed into an environment to provide navigation signals in lieu of or in augmentation to GPS signals. These would be used to augment the reliability and capability of GPS by providing timing and/or navigation aids from static or dynamic positions around the system attempting to navigate. SoOP (signals of opportunity) are similar to pseudolites in that their intent is to aid GPS navigation system, but they differ in one specific way; That is the system attempting to navigate has no control over or coordination with the source of the signal. Of opportunity simply means the system takes what information is available to improve the navigation system. All three (GPS, Psudolites, and SoOP) are susceptible to RF Jamming or spoofing in different ways, and this method can improve the quality of all of them or replace them depending on the application.

Further applications for the systems and methods of the present invention include any system, device or process which can benefit from low-cost, high performance IMU measurements with increased accuracy and less loss of data than traditional systems. One such specific application includes upgrading the fuzing or arming systems and processes for various munitions, rounds, projectiles, and the like. Most such munitions, rounds or projectiles currently require at least two "arming environments" to be met prior to the weapons system, explosive, or other such payload on the vehicle or projectile becoming armed and ready for firing, detonation, or deployment. The present invention creates a "safety zone" in which the weapons systems of the vehicle or projectile are unable to be made ready for firing or deployment. Generally, the safety zone is an area, or rather volume relative to the point of launch (for example, the location where a warfighter is stationed and from which a, for example, UAV is launched with a weapons system on board), Only then would a signal be sent to arm the explosive or other such payload. This ensures that arming and fuzing capabilities are not enabled as long as the vehicle or projectile are within a given range of the base/launch point, thus ensuring the safety of the warfighter and surrounding area. This safety zone can be envisioned as a cylinder with a given radius defining the distance away from the launch point and the space above and/or below, depending on the arena. Other safety zones may be created as well during travel of the vehicle or projectile, for example if a civilian group, town/village, or the like is identified via the sensors. The system may identify and define a safety zone thus preventing the system from being able to arm and fuze the weapons, thus minimizing the risk of civilian casualties and collateral damage. This is a safety measure utilized to prevent accidental or unintended arming of a dangerous payload and thus to prevent detonation or deployment when not specifically intended.

Both for fuzing/arming purposes as well as navigation, the system may include additional sensors that are useful and beneficial for such purposes. Image, video, or other visual sensors provide data that is particularly useful to navigation, fuzing and guidance, in autonomous operation and in semi-autonomous allowing a remote user to actually see the environment in which the vehicle or projectile is presently traversing. Such data can be used for real time flight correction, target identification and tracking, and the like. With respect to arming/fuzing, image data may be used to establish and verify one or more arming environments/conditions to allow the weapons to be made ready and able to be armed and fuzed. Image data can be used to verify the vehicle or projectile location and thus only signal that the arming environment is met when in a particular range of the desired target or location. This is true and useful for both vehicles or projectiles travelling over great horizontal distances and terrains, but also for rounds that are dropped or otherwise deployed substantially vertically. The image data may be used to establish, either alone or in conjunction with other sensors for measuring ranges or distances such as lasers, lidar, radar. sonar, altimeters, and the like. Image data is preferably used to inform the creating of the safety zone. Identifying points and landmarks may be identified within the safety zone or to define the boundaries of the safety zone, such that when the system identifies those points or landmarks in acquired image data, the system knows it is inside the safety zone and disables arming and fuzing capabilities of the weapons systems. This prevents the vehicle or projectile from becoming armed/fuzed and deploying weapons in an undesired location. Image data may be used to establish the trajectory or motion (e.g., spin rate) of the vehicle or projectile itself, and thus signal when such an arming environment is met. Image motion correction techniques, such as those taught in U.S. Pat. No. 10,735,654 which issued on Aug. 4, 2020 and which is hereby incorporated by reference in its entirety for image processing systems and processes, may be particularly helpful in acquiring, processing, and interpreting image data for the various purposes of the present invention. The use of image data either with traditional arming environment considerations or, more preferably, in conjunction with the systems and methods of the invention described herein, provides enhanced safety capabilities with more accurate measurement to ensure such environments are actually met, and also redundancy and/or additional layers of protection.

Several different embodiments of the flight deck unit and system of the present invention are envisioned. Most embodiments are directed to the use of the various sensors to create the safety zone, or safety supervision methods, for ensuring that weapons systems remain safe and weapon-level safeties are unable to be disengaged while in the safety zone. Some embodiments comprise a guidance system while others involve methods of providing guidance and/or location, with all embodiments providing a sum result that is a more accurate and high-resolution location, guidance and navigation result than the component parts are individually capable of, and at least as accurate as high-end, expensive solutions on the market today.

The present invention provides a number of benefits and advantages that can augment and improve, or even fully supplant current technology in use today. The combination of sensors, discussed in greater detail below, allow for flight dynamics to be obtained in virtually any condition including GPS denied or degraded environments where GPS signals are naturally blocked, patchy, or non-existent, or being jammed or spoofed, or under other poor conditions like night time or bad weather that may effect various current systems. The present invention utilizes the sensor combinations and integrations to provide accurate, reliable navigation, guidance, and fuzing even in such conditions. Many embodiments of the present invention may perform a pre-flight (flight being used herein to describe the travel of any projectile or vehicle embodiment, including ground and water travel) calibration which allows the system to avoid in-flight calibration or to minimize the amount of time and power required for initial calibration or recalibration during flight, set a "home" point to keep as a reference point during travel/flight, and preferably calibrates the sensors (e.g., elliptical motions while ascending used to calibrate magnetometers and rate gyroscopes), as well as system orientation calibration (e.g., obtaining/detecting horizon identification and providing initial cross-reference and points of interest). Further, the present invention provides these benefits at a potentially significant reduction in cost and size compared to existing systems, while also being scalable to meet various project or application needs.

Several embodiments of the present invention are envisioned, many comprising various combinations of similar features, elements and adaptations. One such embodiment includes a guidance, navigation and weapons fuzing system comprising: an unmanned aerial vehicle (UAV) comprising at least one visible spectrum image sensor adapted for acquiring visible image data, at least one infrared (IR) image sensor adapted for acquiring infrared image data, and at least one altimeter adapted for measuring altitude data of the UAV; at least one processor comprised on the UAV and adapted to: receive the visible image data, IR image data, and altitude data, process the visible and IR image data to identify and acquire one or more points of interest and define waypoints based on the points of interest, identify and measure relative distances: between the UAV and points of interest, between the UAV and waypoints, and between the waypoints, to determine the UAV's location relative to one or more predefined safe zones, and to provide guidance and control commands to the UAV based on the image data, altitude data, and processed data; and an arming and fuzing subsystem adapted to arm and fuze a weapon system based on a determination that the UAV is outside of the one or more safe zones.

Various alternative or additional features of the embodiments may include a thermal imaging sensor adapted for acquiring thermal image data, and the processor is further adapted to receive the thermal image data and include the thermal image data in in its processing, identifications, and determinations, the processor being further adapted to determine the distances by identifying at least one of the points of interest or waypoints in the image data and calculating the distance to a pixel in the image data corresponding to a given point of interest or waypoint based on the image data and the altitude data, the at least one processor being further adapted to guide the UAV back toward the home location or a rally point based on identifications of the points of interest in reverse order based on the image data and altitude data, the rally point being a safe zone different from the home location and is selected as a safe zone to land the UAV for later retrieval while not leading enemies to the home location, at least one inertial measurement unit (IMU) comprising at least one accelerometer, at least one gyroscope, and at least one magnetometer, the at least one IMU being adapted to provide in-flight data, and the at least one processor is further adapted to recalibrate one or more of the visible spectrum image sensor, at least one infrared (IR) image sensor, and at least one altimeter, a transceiver comprised on the UAV and adapted for transmitting at least one or more of the image data types to a user at a remote location and the transmitted image data is adapted to be used for target identification and selection for the user to deploy the weapons system, the transceiver being adapted to be off, and not transmitting any data, during flight from takeoff to a target location and during flight from the target location to the home location or rally point, and/or the system being adapted to deploy all weapons or rounds of the weapon system and cannot enter a safety zone with undeployed weapons or rounds.

Another embodiment of the present invention includes an unmanned aerial vehicle (UAV) system with guidance, navigation and weapons fuzing system comprising: a sensor subsystem comprising at least one visible spectrum image sensor adapted for acquiring visible image data, at least one infrared (IR) image sensor adapted for acquiring infrared image data, and at least one altimeter adapted for measuring altitude data of the UAV; at least one processor comprised on the UAV and adapted to: receive the visible image data, IR image data, and altitude data, process the visible and IR image data to identify and acquire one or more points of interest and define waypoints based on the points of interest, identify and measure relative distances: between the UAV and points of interest, between the UAV and waypoints, and between the waypoints, to determine the UAV's location relative to one or more predefined safe zones, and to provide guidance and control commands to the UAV based on the image data, altitude data, and processed data; and determine the distances by identifying at least one of the points of interest or waypoints in the image data and calculating the distance to a pixel in the image data corresponding to a given point of interest or waypoint based on the image data and the altitude data.

Various alternative or additional features of the embodiments may include a thermal imaging sensor adapted for acquiring thermal image data, and the processor is further adapted to receive the thermal image data and include the thermal image data in in its processing, identifications, and determinations, the processor being further adapted to determine the distances by identifying at least one of the points of interest or waypoints in the image data and calculating the distance to a pixel in the image data corresponding to a given point of interest or waypoint based on the image data and the altitude data, the at least one processor being further adapted to guide the UAV back toward the home location or a rally point based on identifications of the points of interest in reverse order based on the image data and altitude data, the rally point being a safe zone different from the home location and is selected as a safe zone to land the UAV for later retrieval while not leading enemies to the home location, at least one inertial measurement unit (IMU) comprising at least one accelerometer, at least one gyroscope, and at least one magnetometer, the at least one IMU being adapted to provide in-flight data, and the at least one processor is further adapted to recalibrate one or more of the visible spectrum image sensor, at least one infrared (IR) image sensor, and at least one altimeter, a transceiver comprised on the UAV and adapted for transmitting at least one or more of the image data types to a user at a remote location and the transmitted image data is adapted to be used for target identification and selection for the user to deploy the weapons system, the transceiver being adapted to be off, and not transmitting any data, during flight from takeoff to a target location and during flight from the target location to the home location or rally point, and/or the system being adapted to deploy all weapons or rounds of the weapon system and cannot enter a safety zone with undeployed weapons or rounds.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

Figure 1:
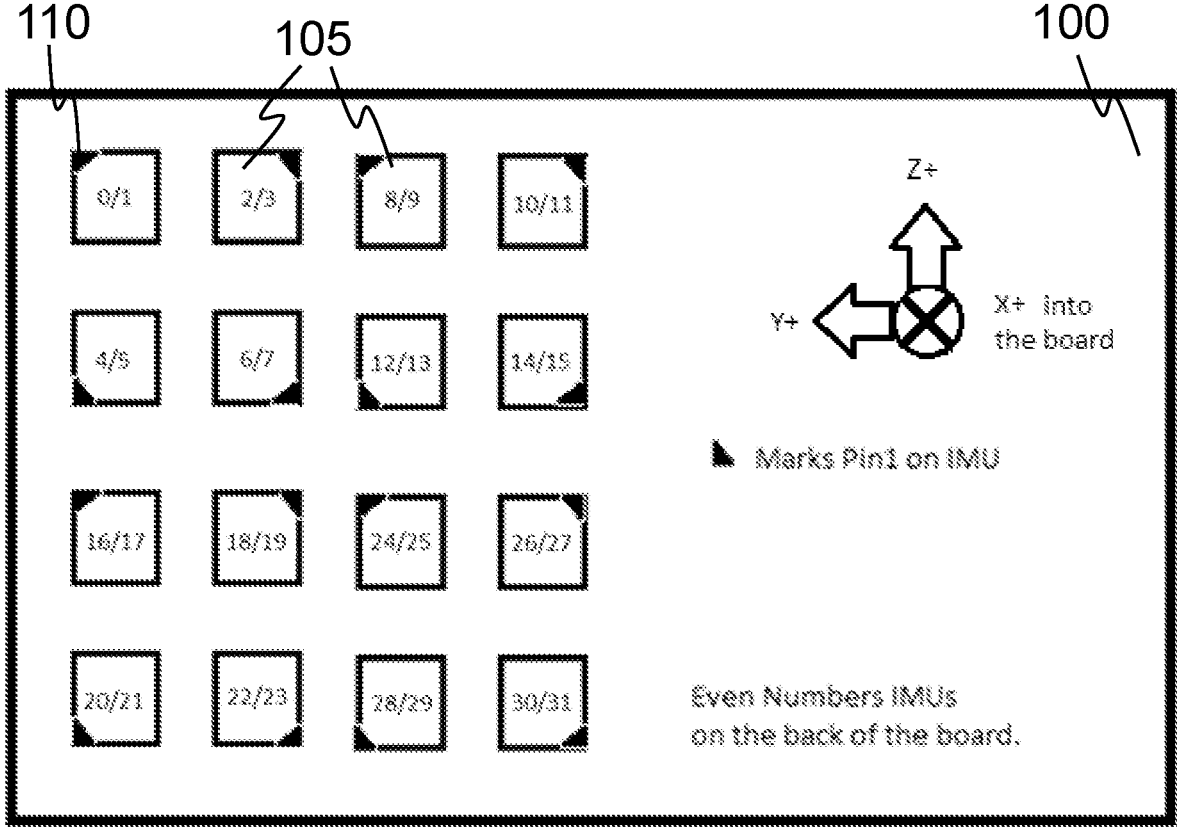
FIG. 1. Schematic diagram depicting one embodiment of the invention with multiple IMUs configured on a single printed circuit board.

DETAILED DESCRIPTION OF THE
INVENTION AND DRAWINGS

The present invention relates to navigation, fuzing, and guidance of vehicles, and more particularly to such capabilities for unmanned vehicles, drones, or other related systems. More particularly, the present invention is directed to a flight deck unit comprising sensors and electronics adapted to perform the navigation, fuzing, and/or guidance for such systems. Preferably, the flight deck unit is adapted for performing navigation, fuzing, and guidance in GPS denied or degraded environments and is immune to spoofing, jamming, and hacking, thereby providing safe and accurate navigation, fuzing, and guidance regardless of the arena or environment. Further, the invention is directed to a system for providing safety supervision of weapons systems on vehicles or projectiles. More particularly, the safety supervision is adapted for ensuring that weapon-level safety measures are unable to be disengaged while the vehicle or projectile is within a safety zone.

The guidance and navigation aspects of the present invention involve combinations of one or more sensors capable of operating in GPS denied or degraded environments, and include one or more of infrared sensors, visual imaging sensors, radar, sonar, gyroscopes, accelerometers, magnetometers, and/or more preferably, one or more inertial measurement units (IMUs) comprising one or more of the above sensors. In many embodiments, combinations of multiple low-accuracy or low-resolution IMUs are utilized to provide high-accuracy or high-resolution location and guidance results while minimizing cost without sacrificing resolution or accuracy. The fuzing aspect of the present invention involve systems adapted for arming and fuzing weapons systems of unmanned vehicles, drones, or systems. More particularly, the present invention includes arming and fuzing systems that ensure such weapons systems ae maintained in a safe state until the unmanned vehicle, drone, or system is either outside a designated "safe zone" or inside a designated "attack zone." The arming and fuzing systems are adapted to utilize similar combinations of sensors to determine when it is appropriate to arm and fuze the weapons systems, and to ensure that the weapons systems are not capable of being armed and fuzed until it is absolutely safe to do so.

The present invention further utilizes an IMU comprising a sensor suite of preferably several sensors used to provide measurements including, but not limited to, body rates, linear accelerations and magnetic disturbance data measurements useful for providing precise navigation and control of vehicles or projectiles including munitions, missiles, or the like, or precise location and guidance to individuals. The present invention may utilize individual inertial sensors (e.g., accelerometers, gyroscopes), though more preferably such sensors are grouped into IMUS comprising one or more of such sensors. The IMUs, in turn, may be used individual IMUs or further grouped together into multi-IMUs (MI-MUs), either of which can be integrated into a guidance electronic unit (GEU)/IMU to be utilized with various systems and devices. Each individual low-end IMU preferably comprises one or more sensors in various combinations, such sensors including, but not limited to accelerometers, gyroscopes, magnetometers, GPS sensors and separate integrated sensor suites. Further, the systems of the present invention utilize a range of sensors for maneuvering or stabilizing the vehicle or projectile during travel. The sensors, for example, may be used to determine the vehicle's or projectile's relative position with respect to a moving target or target location, flow dynamics on a flow surface of a vehicle or projectile, and threats or obstacles in or around the vehicle or projectile. The sensors for determining the relative position may include but are not limited to antennas for acquiring global positioning (GPS as mentioned above), magnetic sensors, solar detectors, and the like. The sensors for determining flow dynamics may include but are not limited to static and/or dynamic pressure sensors, shear stress sensor (hot film anemometer, a direct measurement floating-element shear stress sensor), inertial measurement unit or system, and other sensors known to those skilled in the art whose signal could be used to estimate or determine flow condition such as separation on the surface of the vehicle or projectile, which would function as a trigger point for actuating a control system for maneuvering or controlling the vehicle or projectile. The sensors for determining threats or obstacles in or around the vehicle or projectile include but are not limited to radar detectors, sonar, laser detectors, chemical detectors, heat (or infrared) detectors, and the like. The sensors most useful for determining travel parameters of a vehicle or projectile include accelerometers, magnetometers, IR sensors, rate gyros, and motor controller sensors.

Where IMUs are utilized, such IMUs preferably comprise a processor or controller, more preferably a microcontroller, to integrate and process the sensor signals in order to supply output data related to the conditions measured by the sensors. The processor or controller can be predictive or can respond and actuate any number of other systems such as control systems, guidance and navigation or alarm or warning systems. The controller preferably utilizes one or more digital microprocessors to process signals provided by the various sensors and deliver deployment, activation, or actuation commands to these other systems. Preferably, the present invention utilizes at least one accelerometer (if one is used, then preferably it is a 3-axis accelerometer), but may preferably also include at least one gyroscope (again, if one, then a 3-axis gyroscope), a magnetometer, and/or separate integrated sensor package consisting of at least one or more of these same types of sensors, thus providing redundancy. This redundancy in sensor(s) serves at least two beneficial purposes and although multiple sensors may be used on any individual IMU, in many embodiments the redundancy is at least provided by the utilization of multiple individual low-end IMUs to create a multi-IMU system where redundancy is a result of measurement from at least two or more of the individual IMUs. First, it allows for a significant increase in precision with the customized separate sensor package but in a reduced sensor range (for example +/−16 G, 2,000 dps). The firmware of the IMUs is designed in such a manner that it will be able to adaptively switch between the separate integrated sensor package and the direct accelerometer/gyroscope combination in the IMU at the onset of saturation of each of the sensor's dynamic range. Second, this redundancy allows for an overdetermined system when used to estimate the state/orientation of the projectile. The outputs provided by the additional sensors are always available so that a robust, consistent solution will exist based on IMU outputs. The combination of individual sensors and the separate integrated sensor package allows the present invention to reduce footprint and increase capabilities of the IMUs, particularly when combined in multiples. An additional gyroscope may further be integrated to capture the high-spin environment prior to controlled flight. The IMUs are capable of adaptively transitioning between the gyroscope on separate integrated sensor package and that directly on the IMUs, or between groupings of IMUs.

The present invention still further utilizes, in many embodiments, a transceiver for communicating information between the system and a user. The transceiver is designed to send key information back to the user (e.g., warfighter, response vehicle, remote monitoring station and/or personnel), which can include images/video (EO/IR) and/or travel data (attitude, velocity, position, time of travel, etc.). This information can be used for target identification and prioritization, or location and navigation. The transceiver is designed to be scalable for multiple platforms, most preferably for communication with/between the vehicle or projectile, other vehicles or projectiles, performing target prioritization in flight and offering situational awareness information to the user. Preferably, the transceiver is a radio frequency (RF) transceiver that operates under a frequency-hopping spread spectrum (FHSS) method that rapidly changes and switches communication among a number of frequencies or channels in a pseudorandom sequence that is shared and known by both the transceiver and the remote interface. FHSS is a wireless technology that spreads its signal over rapidly changing frequencies. Each available frequency band is divided into sub-frequencies. Signals rapidly change ("hop") among these in a pre-determined order. Interference at a specific frequency will only affect the signal during that short interval. Further, the transceiver preferably communicates image and/or travel data in real-time. This real-time communication allows a remote user the ability to take control of the projectile or vehicle and perform user-controlled flight from a remote location, or to provide real-time feedback to an individual. The user is fed the image and flight data from the projectile, vehicle or individual in-travel, and through a user interface, send live commands or controls back to the projectile, vehicle or individual in-travel to guide, maneuver or otherwise control the projectile or vehicle, or provide feedback, information or guidance to an individual.

Many embodiments of the present invention further comprise at least one temperature sensor. At least one temperature sensor may be included in the multi-IMU system such that it measures a local temperature about the entire system. Alternatively, individual temperature sensors may be comprised in one or more of the individual low-end IMUs. With multiple temperature sensors, the temperate of each individual IMU or a grouping of IMUs may be obtained. Obtaining a localized temperature measurement, particularly when localized to individual IMUs or groups of IMUs, allows for temperature compensation to be performed. Temperature compensation allows the system to accommodate for differences in temperature between two or more of the individual low-end IMUs and the shift, drift, error, or other differences that can arise based on differing temperatures between the individual low-end IMUs. This is particularly important based on the need for redundancy in measurement between individual low-end IMUs. If one or a group of IMUs is at a different temperature than the rest or other groups, then the individual sensor measurements of each IMU may be skewed or inaccurate with respect to the rest. Thus, in many embodiments, it is important to include at least one, or more preferably a plurality of temperature sensors to allow the system to compensate for such differences in temperatures between individual low-end IMUs, or groups thereof, and ensure accurate and repeatable measurements for each IMU, or to perform the necessary calculations to account for such differences. Temperature sensor measurements may then be factored into the individual low-end IMU measurements such that the individual IMU calculations are normalized to a single IMU, or group thereof, and measurements can be made accurately across the entire multi-IMU system.

The present invention also includes a printed circuit board (PCB), or a series thereof, on which the individual IMUs are to be mounted. The PCB is intended to support and electrically connect each of the components, particularly a plurality of IMUs, attached thereto. Preferably, each PCB has an upper surface and a lower surface, and in many embodiments, both surfaces are electrically conductive and populated with a plurality of IMUs. Although has few as one IMU may be used, preferably multiple IMUs are utilized, and the number of PCBs employed depends on the number of IMUs. Each PCB may include as few as one IMU. More preferably each PCB includes at least two IMUs. Yet more preferably, each PCB includes at least 4 IMUS. Still more preferably, each PCB includes at least 6 IMUs. Even more preferably, each PCB includes at least 8 IMUs. Still yet more preferably, each PCB includes at least 10 IMUs. Even still more preferably, each PCB includes at least 12 IMUs. Still yet more preferably, each PCB includes at least 14 IMUs. Still more preferably, each PCB includes at least 16 IMUs. Yet still more preferably, each PCB includes at least 18 IMUs. Even yet more preferably, each PCB includes at least 20 IMUs. Even still more preferably, each PCB includes at least 22 IMUs. Yet even still more preferably, each PCB includes at least 24 IMUs. Even still yet more preferably, each PCB includes at least 26 IMUs. Still yet even more preferably, each PCB includes at least 28 IMUs. Even yet still more preferably, each PCB includes at least 28 IMUs. Yet still even more preferably, each PCB includes at least 30 IMUs. Still even yet more preferably, each PCB includes at least 32 IMUs. Even still yet more preferably, each PCB includes at least 34 IMUs. More preferably still, each PCB includes as many as 36 IMUs. Further, multiple PCBs may be combined as well to further multiply the number of individual low-end IMUs present in the multi-IMU system.

The total number of PCBs, and thus the total number of low-end IMUs, is only limited by the constraints of the application for which the multi-IMU systems are being designed. A multi-IMU for a projectile is limited at least in part by the size, shape, and aerodynamic requirements of the projectile. A multi-IMU for a first responder or military personnel is limited at least by the form factor of the housing and weight requirements for ease of use by the individual. A multi-IMU for an automobile or other vehicle is limited at least by the size and shape of the housing where the multi-IMU will be mounted. With respect to the constraints of each individual embodiment, it is preferable that the multi-IMU comprise at least one PCB board with a plurality of IMUs mounted on each board. More preferably, the multi-IMU comprises at least two PCB boards with a plurality of IMUs mounted on each board. Still more preferably, the multi-IMU comprises at least three PCB boards with a plurality of IMUs mounted on each board. Yet more preferably, the multi-IMU comprises at least four PCB boards with a plurality of IMUs mounted on each board. Even more preferably, the multi-IMU comprises five or more PCB boards with a plurality of IMUs mounted on each board. Given the number of PCB boards utilized for a given embodiment of the present invention, it is preferably that the multi-IMU system comprises at least 1 IMUs. More preferably, the multi-IMU system comprises at least 2 IMUs. Yet more preferably, the multi-IMU system comprises at least 4 IMUs. Still more preferably, the multi-IMU system comprises at least 8 IMUs. Even more preferably, the multi-IMU system comprises at least 12 IMUs. Still even more preferably, the multi-IMU system comprises at least 16 IMUs. Even yet more preferably, the multi-IMU system comprises at least 20 IMUs. Yet still more preferably, the multi-IMU system comprises at least 24 IMUs. Still yet more preferably, the multi-IMU system comprises at least 28 IMUs. Yet even more preferably, the multi-IMU system comprises at least 32

IMUs. Even still more preferably, the multi-IMU system comprises at least 36 IMUs. Even yet more preferably, the multi-IMU system comprises at least 40 IMUs. Yet even more preferably, the multi-IMU system comprises at least 44 IMUs. Even still more preferably, the multi-IMU system comprises at least 48 IMUs. Still even yet more preferably, the multi-IMU system comprises at least 52 IMUs. Even yet still more preferably, the multi-IMU system comprises at least 56 IMUs. Yet still even more preferably, the multi-IMU system comprises at least 60 IMUs. Yet more preferably, the multi-IMU system comprises at least 64 IMUs. Even yet more preferably, the multi-IMU system comprises at least 68 IMUs. Still more preferably, the multi-IMU system comprises at least 72 IMUs. Yet even more preferably, the multi-IMU system comprises at least 76 IMUs. Even still more preferably, the multi-IMU system comprises 80 or more IMUs. Again, the total number of low-end, low resolution IMUs is only limited by the number of boards that can fit within the constraints of the particular embodiment, and more IMUs contained in the multi-IMU leads to even greater accuracy and precision of measurement.

Depending on the number of IMUs that are present, the IMUs can be configured in a number of orientations and locations, and thus spatial diversity among IMU sensors may be obtained and oriented to achieve the greatest possible sensor resolution. Preferably, each surface of the PCB is divided into four quadrants, each individually separate but interconnected with the other through the wiring of the PCB as well as firmware contained in the processor(s) or microprocessor(s). Preferably, the IMUs, when mounted in multiples, are each mounted in a different geometric, directional and special orientation. An example of this orientational mounting can be found in FIG. 1. Mounting each IMU in a given quadrant in a different orientation allows for the multi-IMU sensor system to be largely self-calibrating. Redundant measurements are obtained from each individual IMU, but each is oriented differently, thus allowed the system to coordinate the measurements and calibrate the system based on the measurements of each IMU. It is known to those having ordinary skill in the art that the high-g environment of gun launch causes the baseline of sensors to shift. This is analogous to weighing an object and noticing the scale reading is not "0" without any weight on the scale, thus, one "tares" the scale to "0" otherwise the weight would be inaccurate by this offset. To overcome sensor data offsets associated with exposure to high g environments, COTS sensor manufacturers have devised MEMS accelerometers to better withstand the challenges of acquiring precise and accurate sensor data after a high g event. These sensors, referred to as high-g shock accelerometers, sacrifice resolution in order to have full scale range of +/−60,000 g and can operate after being exposed to 120,000 g event. On the other hand low g sensors with full scale ranges of +/−2 g, +/−4 g+/−8 g, +/−16 g etc. have much greater resolution—the type of resolution used to determine position and orientation. However, low-g accelerometers are much more susceptible to baseline shifts after being exposed to the high g environment of gun launch and are only recommended for operation in high g environments of less than 20,000 g. If the shifts or offset can predicted, measured, or calculated, then these high resolution, low g sensors may be utilized after exposure to high g environments. The objective is to quantify this baseline shift and then adjust or recalibrate these sensors in real-time and while in operation to account for the baseline shift. If one IMU begins to drift or develops of bias or shift, the difference will be evident in relation to at least one of the many other IMUs present in most embodiments.

Thus, the drifting IMU can be recalibrated to be accurate, or the shift/bias/drift can be accounted for in any ongoing measurements. Each surface of the PCB is effectively a two-dimensional surface upon which the IMUs are mounted. Accordingly, the IMUs are preferably mounted in a different orientation in the y-axis and z-axis of the given surface of the PCB, where the x-axis is that perpendicular to the surface of the PCB and going into and through the PCB. By way of example, if each IMU were to have an effective top or prime direction, then the top or prime direction of each IMU can be mounted on the surface of the PCB in a given quadrant such that each IMU in the quadrant faces a different direction. In this example, one may assume that if one IMU is mounted with its top or prime direction to the "north" of the PCB quadrant, then each of the other IMUs mounted within that quadrant should be mounted with their top or prime direction in a different direction relative to the y- and z-axes of the board. In most embodiments, each quadrant may include up to 4 IMUs, though with advancements in miniaturization, more IMUs may be configured within each quadrant. Thus, in many embodiments, each PCB may include up to 32 IMUs—4 in each quadrant of each surface. As noted above, each of the IMUs are interconnected both electrically through the conduits of the PCB, and through firmware. Various firmware routines can be envisioned linking the individual low-end IMUs such that the IMUs perform their measurements in any sequence, order, or combination thus providing redundant and substantially continuous measurement. Each of the individual IMUs exhibits a signal that corresponds to any one or more of the sensors contained thereon (e.g., accelerometer, gyroscope, magnetometer, temperature sensors, and the like). The IMU signal may contain a single sensor measurement or may be a combination thereof, or may be a semi-processed or processed version of any combination.

Preferably, the entire multi-IMU is presented in am miniaturized form factor. In this vain, preferably, the multi-IMU is adapted to be produced in a package size less than 3 in$^3$. More preferably, the multi-IMU is adapted to be produced in a package size less than 2 in$^3$. Still more preferably, the multi-IMU is adapted to be produced in a package size less than 1.5 in$^3$. Yet more preferably, the multi-IMU is adapted to be produced in a package size less than 1 in$^3$. Even more preferably, the multi-IMU is adapted to be produced in a package size less than 0.9 in$^3$. Yet still more preferably, the multi-IMU is adapted to be produced in a package size less than 0.8 in$^3$. Still even more preferably, the multi-IMU is adapted to be produced in a package size less than 0.75 in$^3$. Even yet more preferably, the multi-IMU is adapted to be produced in a package size less than 0.7 in$^3$. Yet even more preferably, the multi-IMU is adapted to be produced in a package size less than 0.6 in$^3$. Even still more preferably, the multi-IMU is adapted to be produced in a package size less than 0.5 in$^3$.

In many embodiments, the multi-IMU is integrated with a recalibration module, where this combination forms at least one embodiment of an enhanced performed IMU (EP-IMU). Full descriptions and various EP-IMU embodiments are described in U.S. patent application Ser. No. 16/993,336, filed on Aug. 14, 2020, and hereby again incorporated by reference in its entirety for the various EP-IMU embodiments and characteristics as they can be applied to the present invention. With specific respect to the multi-IMU (MIMU) portion of the EP-IMU, such multi-IMU and therefore the EP-IMU, leverages optimized sensor array placement (spatial diversity of sensors) and packaging of several ultra-low cost IMUs and a mixture of higher grade IMUs within a single compact package. When all available sensor data from these strategically placed IMUs are passed through statistical sensor fusion algorithms, the EP-IMU accuracy is increased by orders of magnitude, and thus, the fully integrated EP-IMU system integrates the individual IMUs to perform as, or equivalent to, a single tactical grade IMU, but with additional benefits of measurement redundancy and expanded ranges. The EP-IMU of the present invention provides guidance grade performance similar to higher cost (and larger sized) commercially available IMUs necessary for GNC applications. Each multi-IMU of the EP-IMU is preferably designed to provide sensor information to a support module, and ultimately to the mission control computer. The multiple individual IMUs provide body rates, acceleration and magnetic measurements preferably at high frequencies, for example up to about 100 samples per second. More preferably, the multiple individual IMUs provide body rates, acceleration and magnetic measurements at frequencies up to about 200 samples per second. Still more preferably, the multiple individual IMUs provide body rates, acceleration and magnetic measurements at frequencies up to about 300 samples per second. Yet more preferably, the multiple individual IMUs provide body rates, acceleration and magnetic measurements at frequencies up to about 400 samples per second. Even more preferably, the multiple individual IMUs provide body rates, acceleration and magnetic measurements at frequencies up to about 500 samples per second. Still yet more preferably, the multiple individual IMUs provide body rates, acceleration and magnetic measurements at frequencies up to about 600 samples per second. Yet even more preferably, the multiple individual IMUs provide body rates, acceleration and magnetic measurements at frequencies up to about 700 samples per second. Even still more preferably, the multiple individual IMUs provide body rates, acceleration and magnetic measurements at frequencies up to about 800 samples per second. Yet still more preferably, the multiple individual IMUs provide body rates, acceleration and magnetic measurements at frequencies up to about 900 samples per second. Still even more preferably, the multiple individual IMUs provide body rates, acceleration and magnetic measurements at frequencies up to about 1000 samples per second. Even yet more preferably, the multiple individual IMUs provide body rates, acceleration and magnetic measurements at frequencies greater than 1000 samples per second. The preferred multi-IMU comprises: a) multiple IMUs, b) at least one controller, processor, microcontroller, microprocessor, or the like, c), power supply and d) communication interface.

In one preferred embodiment of the multi-IMU of the EP-IMU, the multi-IMU comprises the following sensors and design strategies, where such are illustrative of the types of sensors and strategies that may be used, are not intended to be limiting, and may be interchangeable with those presently known or later developed and known to those of ordinary skill in the art. With respect to specific accelerometers, H3LIS331DL are low-power high-performance, digital, triaxial accelerometers with dynamically selectable ranges of 100 g/+200 g/+400 g and capable of measuring accelerations with output data rates of 1 kHz. In this preferred and exemplary embodiment, these accelerometers can be mounted on opposite sides of the PCB, 10 mm off-center and rotated 90° relative to each other. Having the axes exchanged helps mitigate different drift rates. Both accelerometers may be combined to provide roll rate data when gyroscopes are saturated (at roll rates faster than 5.5 Hz). These accelerometers will also provide acceleration data when the low g, high resolution, accelerometers are saturated. With regard to low-end IMUs, LSM6DSO are low-cost IMUs that contain both accelerometers and rate gyros. These low g, high resolution 3-axis digital accelerometers have dynamically selectable ranges of 2 g/+4 g/+8 g and +16. The 3D gyroscopes have a full range of +2,000 degrees per second which will measure spin rates up to about 5.5 Hz. In this preferred and exemplary embodiment, eight LSM6DSO IMUs can be mounted on opposite sides of the PCB and rotated 90° relative to each other to provide X, Y and Z accelerations and yaw, pitch and roll rates. Again, rotating the axes helps mitigate different drift rates. With respect to specific magnetometers, BM1422AGMV are 3-axis magnetic sensors with magneto-impedance (MI) elements which detect magnetic field and enable recalibration of the gyroscopes in the EP-IMU. Again, in the preferred and exemplary embodiment, these digital magnetometers will be mounted on opposite sides of the PCB and rotated 90° degrees from each other.

A benefit of particular note regarding the EP-IMU is the ability of the high g accelerometer within the recalibration module to recalibrate (correct errors/offsets/bias of) other IMUs within the EP-IMU, including the lower g IMUs. These other IMUs can be used for Fuzing upgrades (e.g., AMP), Navigation capabilities (e.g., MP-ERM, XM1155, SLRC), and specialized test and evaluation (up to 120,000 gs). For the warfighter using an AMP round the only required program is the distance to burst. Because the EP-IMU directly computes position, there is no need to convert distances back and forth to time. For direct fire missions, it is possible to achieve the needed performance with only a single axis sensor. For missions where the projectile's trajectory is more parabolic and longer range, the triaxial version can deliver 6 degrees of freedom information needed to compute slant distance and other important information.

In order to coordinate the signals from each of the IMUs, the present invention employs one or more algorithms, either on a central processor or on individual processors comprised on one or more of the individual low-end IMUs. Preferably, one or more of the individual low-end IMUs comprise a processor or microprocessor in order to perform at least localized coordination, pre-processing, and/or processing of the signals from the local sensors and/or IMUs. These processors may also receive and execute commands from outside sources or from a global processor that is adapted to coordinate, process, and to some degree control individual processors or microprocessors. Preferably, at least one guidance algorithm is employed, and is adapted to coordinate and synchronize all of the data from the individual IMUs, and to combine them in a manner that yields a generalized, global output that represents the combined total of all of the individual IMU measurements, but is in the form of a single IMU measurement. In other words, the guidance algorithm synthesizes all of the individual IMU data and combines it such that the output of the guidance algorithm is that of a single IMU. Preferably, the guidance algorithm calculates and outputs a guidance metric, either as part of the generalized, global output or as a separate and distinct output metric, where the guidance metric is preferably representative of the absolute or relative location or position of the body (e.g., projectile or vehicle) in which the system is employed. In embodiments where the guidance metric is a separate and distinct output, it is calculated based at least in part on the measurements from one or more individual IMUs, or the multi-IMU system as a whole. Another important consideration for the present invention is the offset, bias, drift, shift and other error that occurs in each individual low-end IMU. In some embodiments, localized error correction algorithms may be employed on processors or microprocessors on individual low-end IMUs in order to detect and correct or take into account these sources of error in the individual IMUs. Such algorithms may be employed on each individual IMU, or they may be employed on a sub-group basis, for example where a microprocessor on one individual IMU of a quadrant on the PCB corrects of such errors among all of the IMUs on that quadrant, and then transmits error-corrected data for all IMUs on that quadrant to a global or central processor and guidance algorithm. Alternatively, the central or global processor and guidance algorithm may coordinate and synthesize the data from all IMUs, or groups of IMUs, and correct or account for the errors in each accordingly. The type of system and combination of algorithms depends on the form factor of the multi-IMU system, and the constraints thereof regarding size and computing power required for the various algorithmic options.

The multi-IMU systems and methods of the present invention further include the ability to perform calibration steps among the sensors of the various individual IMUs, and of the multi-IMU system as a whole. As noted, in one exemplary embodiment, the PCBs of the present invention are divided into quadrants with one or more individual low-end IMUs mounted on each quadrant, preferably in different orientations with respect to the X, Y- and Z-axes of the board. With such a configuration, each IMU preferably takes redundant measurements with the sensors thereof. Over time, each IMU is subject to varying forms and degrees of error, with various biases, shifts, drifts, and the like. With redundant measurement among multiple IMUs, the signals from the sensors of each IMU may be coordinated and synchronized such that the signals from all can be normalized to a common set point. Although all of the IMUs are subject to the onset of such error, the likelihood of all of the IMUs experiencing such error in the same measurements, at the same times, to the same degrees is very low. Accordingly, the individual sensor measurements can effectively be monitored and the onset of error noticed as time passes. Thus, any detected error in any measurement of any sensor of any of the IMUs may be corrected by recalibrating the individual sensor or IMU, or by accounting for the detected error in the calculations of the system. This calibration is even further augmented by sequentially sampling the measurements from individual IMUs or groups of IMUs, thus providing a continuing error-check algorithm and system that monitors and detects error in the individual sensor or IMU measurements, which can be correlated to the other IMUs or groups of IMUs in order to more rapidly detect such error. Thus, the sensors and IMUs re substantially continuously calibrated against the other sensors and IMUs, all of which are normalized to obtain accurate and precise measurements even in the presence or onset of error in an individual sensor or IMU.

Also, as noted, the EP-IMU preferably includes a recalibration module that is capable of real-time recalibration of the multiple individual IMUs and or the multi-IMU as a unit, and such recalibration may be performed at any time, most preferably following a high g shock event, such as firing or launching. In one preferred, and exemplary but non-limiting embodiment, the recalibration module includes a 60,000 g accelerometer that uses a micro-machined, piezoresistive sensor with light gas damping to attenuate resonant amplitudes, and mechanical stops to reduce breakage. The accelerometer features a four active arm bridge circuit. With a frequency response extending down to dc (steady state acceleration) and a minimum post shock zero shift, this exemplary accelerometer is designed for measuring gun launch accelerations. The present invention includes high precision, high speed electronics adapted to accurately capture and integrate the acceleration and attain an accurate muzzle velocity. Shifts in bias are corrected by a second integration (position) that is compared to the actual muzzle length. This error is used to retroactively, but in real time, correct this accelerometer's bias shift. The recalibration module is designed and adapted to work in conjunction with the multi-IMU and interface to the support module via a communication port (e.g., an RS485 port) and a power connection. The combined modules MIMU and Recalibration modules (and sometimes the Support module) are referred to as the EP-IMU.

The recalibration module comprises several elements, described in greater detail below, that separate it from current approaches. In some embodiments, the recalibration module may utilize a direct recalibration method which employs a high accuracy shock accelerometer instead of a statistical fit based on similar projectiles. This shock accelerometer can be used to accurately measure accelerations, preferably in all three axes, throughout the occurrence of a high g shock event, such as firing or launching, without saturation or losing accuracy, and thus providing baseline information throughout the high g shock event before the other IMUs and/or EP-IMUs take over. Second, a novel low computational overhead bias correction approach utilizing recalibration calculations and algorithms, again described in greater detail below, is preferably utilized that is enabled by low computational overhead feature extraction algorithms. These innovations allow the sensor recalibration to occur within milliseconds of gun launch, so that the position information can be readily used by the projectile. Third, a high performance analog and digital front end that digitizes the acceleration data to extremely high resolution may be employed to provide resolution as high as about 0.007 gs per step. This front end allows for stable measurements and improves the accuracy of the integrations of the acceleration data needed to deliver the desired positon data. Fourth, the shock accelerometer described above can be used as an in-flight recalibration reference for other IMUs. By implementing all the above innovations the Recalibration Module becomes the "answer key" for all the other sensors, by offering exact initial positions, velocities, and sensor biases that can dramatically improve a control system or navigation solution.

Processing the individual IMU measurements or measurements from groupings of IMUs allows for recalibration algorithms to utilize measured data in relation to fixed and known information in order to recalibrate the sensors via the recalibration module. With particular respect to acceleration (accelerometer) data from the IMUs, various calculations and derivations may be performed, as known to a person ordinarily skilled in the art. Integrating the acceleration data produces a velocity curve over time. Integrating the velocity curve creates a plot of position with respect to time. Once the position is known at a given moment in time that position may be compared against and aligned with a known reference position. For purposes of the present invention, a convenient and particularly relevant and useful known reference position is the muzzle length or the end of the muzzle o the gun from which the round is fired or launched. The position curves (position with respect to time) can then be adjusted for the fixed and known position, and the reverse mathematical operations can be performed to return from position data to velocity and acceleration data (i.e., taking the first derivative of the position data to obtain velocity with respect to time, and the second derivative of the position data to obtain acceleration with respect to time), but where the newly derived values are recalibrated and zeroed with respect to the fixed and know muzzle length/end position. Thus, the recalibrated data is adjusted to account for any sensor error, offset, or bias shift that occurs during or resulting from firing or launch. Only one additional piece of data is needed about the system outside of what is measured by the IMU, MIMU, and/or EP-IMU, and that is the barrel length. With a known barrel length the sensor can recalibrate itself, post launch and in real-time, which improves position data accuracy as well as IMU bias for high bandwidth control.

The recalibration module and recalibration algorithms may utilize equations such as Equations 2, 3, and 4, in order to calculate the amount of sensor error, offset, or bias shift that has occurred, such as resulting from a high g shock event (e.g., firing or launch).

$$ZAccel_{bias} = \frac{2(ZP@tME - L_{actual})}{(tME - t0)^2} \qquad \text{Equation 2}$$

$$YAccel_{bias} = \frac{2(YP@tME)}{(tME - t0)^2} \qquad \text{Equation 3}$$

$$XAccel_{bias} = \frac{2(XP@tME)}{(tME - t0)^2} \qquad \text{Equation 4}$$

t0 is the moment in time at which launch or firing is initiated, and tME is the moment in time at which the projectile exits the muzzle or barrel. Both t0 and tME are important values that should be known in order to perform the recalibration to correct for sensor error, offset, or bias shift. Further variables presented in the Figure and its equations for recalibration include ZP@tME, YP@tME, XP@tME, $L_{actual}$, $ZAccel_{bias}$, $YAccel_{bias}$, and $XAccel_{bias}$. ZP@tME, YP@tME, and XP@tME each represent the value of the projectile's position integral (position data) in the respective axis at the time of muzzle or barrel exit. Thus, ZP@tME is the calculated position data or position integral value in the Z axis at the time the projectile exits the muzzle or barrel, and similar for YP@tME in the Y axis and XP@tME with the x axis. $L_{actual}$ is the actual known length of the barrel from which the projectile is fired or launched. $ZAccel_{bias}$, $YAccel_{bias}$, and $XAccel_{bias}$ are the axis-respective values by which the measured sensor values are adjusted to enable accurate post-launch position calculation. In other words, $ZAccel_{bias}$, $YAccel_{bias}$, and $XAccel_{bias}$ are the amounts by which each axis of the sensor(s) is offset or bias shifted, such as a result of the firing or launch of the projectile. Equations 2, 3, and 4 may be utilized in order to calculate the error, offset, or bias shift values for the sensors in each axis, and therefore to recalibrate the sensors by shifting measured values in accordance with the calculated error, offset or bias shift in each axis. Once these offset or bias values are calculated, the error, offset, or shift bias in the sensor recordings that is caused by the firing or launch of the projectile is known, and can be used to recalibrate the sensors in each axis in order to provide accurate and real time measurements throughout the rest of the flight of the projectile.

Many embodiments of the present invention include a handshake capability feature whereby different groupings of IMUs (e.g., individual IMUs, groups of IMUs and/or sub-groups of IMUs) are used to measure and guide the system under different conditions. As the particular body encounters changing external conditions, the electronics of the multi-IMU system change between various groupings of IMUs by providing a handshake signal indicating that one group of IMUs is to hand over control to a different group, subgroup of individual IMU. This capability enables the system to use varying configurations of IMUs to function and be active in the types of conditions and environments for which each group is best suited. Groupings of IMUs that provide larger dynamic range but a lower resolutions are useful to provide accurate measurement in harsher environments, but conversely, groupings of IMUs that provide more precise measurement at higher resolutions but in lower dynamic ranges can be used in less harsh environments.

The various embodiments of the present invention preferably utilizes a customizable and programmable grouping process for the IMUs in each embodiment whereby the specific groupings of IMUs, and the capabilities and ranges of each group, can be selected for the particular mission, platform, environment, or other such variable considered during operation of the invention. In the case of various projectiles, different types of vehicles or projectiles experience different launch and flight conditions and environments. Therefore, it is preferable if the groupings of IMUs selected are tailored to the particular conditions the vehicle or projectile is likely to experience. Depending on the type of body to which the multi-IMU system is mounted for measurement, preferably, the multi-IMU system comprises at least two groupings of IMUs for measuring different ranges of conditions. More preferably, the multi-IMU system comprises at least three groupings of IMUs for measuring different ranges of conditions. Each of the groupings may cover specific and distinct ranges, or there may be some overlap between the ranges in order to provide redundancy at the transition points between ranges. Such overlapping ranges, including specific examples and embodiments, are described in U.S. Pat. Nos. 10,527,425, 11,118,909, and U.S. patent application Ser. No. 17/395,570 which was filed on Aug. 6, 2021, each of which is again hereby incorporated by reference in its entirety, and each of which provides explicit detail on IMU groupings and handshakes between groups for various measurements and environments.

In order to embody or enact the handshake capability, the present invention preferably includes a handshake algorithm adapted to receive input from the IMUs of the system and to determine the particular group or subgroup of IMUs that is best adapted to employ under the real-time flight or travel conditions. The IMUs of the present invention, either alone or in combination with each other, measure various conditions, states, movements or metrics of the body in which it is mounted, most commonly acceleration (1- or 3-axis acceleration via accelerometers) and/or spin rate (1- or 3-axis acceleration via gyroscopes), but other sensors may also be included such as magnetometers Regardless of the body or platform on which the multi-IMU and electronic handshake systems are deployed, it is important to note that the IMU grouping can be either exclusive of one another or may overlap in ranges and provide redundant measurements. It is also important to note that any single individual IMU of the multi-IMU system may be part of more than one grouping. Individual IMUs may be called upon as part of different groupings to achieve the desired dynamic range and/or resolution for the grouping. The groupings for handshake capability may be pre-defined as the module is produced or manufactured such that the various individual IMUs of a particular group are hardwired together to create a group, though more preferably the IMUs can be selected and programmed at any point, from production of the system through real-time use in-travel, to be part of a desired grouping.

Accuracy, for the purposes of the present invention, can be measured or determined in numerous ways or by numer- ous metrics. With respect to navigation and guidance, or more accurately the measurements of IMUs and their sen-sors, accuracy of IMUs may often be measured by an error measurement of Angular Random Walk (ARW) which is a measurement of noise or error in the operation of an IMU, or of an individual sensor comprised in the IMU. An acceptable ARW value for a typical commercial grade IMU may be on the order of approximately $5/\sqrt{hour}$; an acceptable ARW value for a typical industrial grade IMU may be on the order of approximately $3°/\sqrt{hour}$; an acceptable ARW value for a typical tactical grade IMU may be on the order of approximately $0.07°/\sqrt{hour}$; and an acceptable ARW value for a typical navigation grade IMU may be on the order of approximately $0.002°/\sqrt{hour}$. It is the goal of the present invention to provide multi-IMU systems and methods uti-lizing lower grade IMUs to create a multi-IMU system that exhibits tactical or even navigation grade performance. Thus, although the individual IMUs mounted on each PCB may be of commercial or industrial grade, the overall multi-IMU system performance is actually close to that of tactical or navigation grade IMUs. Accordingly, it is pref-erable that the multi-IMU system exhibit an angular random walk (ARW) value of $5°/\sqrt{hour}$ or less. More preferably, the multi-IMU system exhibits an ARW of $4°/\sqrt{hour}$ or less. Still more preferably, the multi-IMU system exhibits an ARW of $3°/\sqrt{hour}$ or less. Yet more preferably, the multi-IMU system exhibits an ARW of $2°/\sqrt{hour}$ or less. Even more preferably, the multi-IMU system exhibits an ARW of $1°/\sqrt{hour}$ or less. Still yet more preferably, the multi-IMU system exhibits an ARW of $0.5°/\sqrt{hour}$ or less. Yet even more preferably, the multi-IMU system exhibits an ARW of $0.1°/\sqrt{hour}$ or less. Even still more preferably, the multi-IMU system exhibits an ARW of $0.07°/\sqrt{hour}$ or less. Yet still more preferably, the multi-IMU system exhibits an ARW of $0.05°/hour$ or less. Still even more preferably, the multi-IMU system exhibits an ARW of $0.03/\sqrt{hour}$ or less. Even yet more preferably, the multi-IMU system exhibits an ARW of $0.01/\sqrt{hour}$ or less. Still even yet more preferably, the multi-IMU system exhib-its an ARW of $0.009°/\sqrt{hour}$ or less. Even yet still more preferably, the multi-IMU system exhibits an ARW of $0.007°/\sqrt{hour}$ or less. Yet still even more preferably, the multi-IMU system exhibits an ARW of $0.005°/\sqrt{hour}$ or less. Even still yet more preferably, the multi-IMU system exhib-its an ARW of $0.003°/\sqrt{hour}$ or less. Still yet even more preferably, the multi-IMU system exhibits an ARW of $0.002°/\sqrt{hour}$ or less. Yet even still more preferably, the multi-IMU system exhibits an ARW of $0.001°/\sqrt{hour}$ or less. The actual performance of the multi-IMU system may be dictated by the number of individual lower-grade IMUs that are used, which in turn may be dictated by the application and any constraints associated with such application.

Another way to gauge the performance of the multi-IMU system is by the relative improvement over the performance of any individual IMU contained therein. By such metrics, preferably the multi-IMU system exhibits an overall or global ARW that is less than ¾ of the ARM of any individual lower-grade IMU comprised therein. More preferably the multi-IMU system exhibits an overall or global ARW that is less than ⅔ of the ARW of any individual lower-grade IMU comprised therein. Still more preferably, the multi-IMU system exhibits an overall or global ARW that is less than ⅓ of the ARW of any individual lower-grade IMU comprised therein. Yet more preferably, the multi-IMU system exhibits an overall or global ARW that is less than ¼ of the ARW of any individual lower-grade IMU comprised therein. Even more preferably, the multi-IMU system exhibits an overall or global ARW that is less than 1/10 of the ARW of any individual lower-grade IMU comprised therein. Still yet more preferably, the multi-IMU system exhibits an overall or global ARW that is less than 1/20 of the ARW of any individual lower-grade IMU comprised therein. Yet even more preferably, the multi-IMU system exhibits an overall or global ARW that is less than 1/50 of the ARW of any individual lower-grade IMU comprised therein. Even still more preferably, the multi-IMU system exhibits an overall or global ARW that is less than 1/75 of the ARW of any individual lower-grade IMU comprised therein. Still even more preferably, the multi-IMU system exhibits an overall or global ARW that is less than 1/100 of the ARW of any individual lower-grade IMU comprised therein. Even yet more preferably, the multi-IMU system exhibits an overall or global ARW that is less than 1/200 of the ARW of any individual lower-grade IMU comprised therein. Yet still more preferably, the multi-IMU system exhibits an overall or global ARW that is less than 1/400 of the ARW of any individual lower-grade IMU comprised therein. Still even yet more preferably, the multi-IMU system exhibits an overall or global ARW that is less than 1/600 of the ARW of any individual lower-grade IMU comprised therein. Even yet still more preferably, the multi-IMU system exhibits an overall or global ARW that is less than 1/800 of the ARW of any individual lower-grade IMU comprised therein. Yet still even more preferably, the multi-IMU system exhibits an overall or global ARW that is less than 1/1000 of the ARW of any individual lower-grade IMU comprised therein. Still even yet more preferably, the multi-IMU system exhibits an overall or global ARW that is less than 1/1250 of the ARW of any individual lower-grade IMU comprised therein. Even still yet more preferably, the multi-IMU system exhibits an overall or global ARW that is less than 1/1500 of the ARW of any individual lower-grade IMU comprised therein. Still yet even more preferably, the multi-IMU system exhibits an overall or global ARW that is less than 1/1750 of the ARW of any individual lower-grade IMU comprised therein. Yet even still more preferably, the multi-IMU system exhibits an overall or global ARW that is less than 1/2000 of the ARW of any individual lower-grade IMU comprised therein. Even yet still more preferably, the multi-IMU system exhibits an overall or global ARW that is less than 1/2250 of the ARW of any individual lower-grade IMU comprised therein. Yet still even more preferably, the multi-IMU system exhibits an overall or global ARW that is less than 1/2500 of the ARW of any individual lower-grade IMU comprised therein. Still even yet more preferably, the multi-IMU system exhibits an overall or global ARW that is less than 1/2750 of the ARW of any individual lower-grade IMU comprised therein. Even more preferably still, the multi-IMU system exhibits an overall or global ARW that is less than 1/3000 of the ARW of any individual lower-grade IMU comprised therein. Alter-natively these metrics may be expressed as percentages of the ARW of the low-grade IMU.

Other measurements of error may also be used alterna-tively or in addition to ARW in order to determine the level of performance of the multi-IMU system. With specific respect to accelerometer measurements, accelerometer bias error (ABE) may be measured and used to compare the accuracy of the multi-IMU system to an individual IMU comprised therein. An acceptable ABE value for a typical commercial grade IMU may be on the order of approximately 125 mG; an acceptable ABE value for a typical industrial grade IMU may be on the order of approximately 3 mG; an acceptable ABE value for a typical tactical grade IMU may be on the order of approximately 0.3 mG; and an acceptable ABE value for a typical navigation grade IMU may be on the order of approximately 0.025 mG. Accordingly, it is preferable that the multi-IMU system exhibit an overall average accelerometer bias error (ABE) value of 125 mG or less. More preferably, the multi-IMU system exhibits an average ABE of 100 mG or less. Still more preferably, the multi-IMU system exhibits an average ABE of 75 mG or less. Yet more preferably, the multi-IMU system exhibits an average ABE of 50 mG or less. Even more preferably, the multi-IMU system exhibits an average ABE of 25 mG or less. Still yet more preferably, the multi-IMU system exhibits an average ABE of 10 mG or less. Yet even more preferably, the multi-IMU system exhibits an average ABE of 5 mG or less. Even still more preferably, the multi-IMU system exhibits an average ABE of 3 mG or less. Yet still more preferably, the multi-IMU system exhibits an average ABE of 1 mG or less. Still even more preferably, the multi-IMU system exhibits an average ABE of 0.75 mG or less. Even yet more preferably, the multi-IMU system exhibits an average ABE of 0.5 mG or less. Still even yet preferably, the multi-IMU system exhibits an average ABE of 0.25 mG or less. Even yet still more preferably, the multi-IMU system exhibits an average ABE of 0.1 mG or less. Yet still even more preferably, the multi-IMU system exhibits an average ABE of 0.08 mG or less. Even still yet more preferably, the multi-IMU system exhibits an average ABE of 0.0 G mG or less. Still yet even more preferably, the multi-IMU system exhibits an average ABE of 0.04 mG or less. Yet even still more preferably, the multi-IMU system exhibits an average ABE of 0.02 mG or less. Again, the actual performance of the multi-IMU system may be dictated by the number of individual lower-grade IMUs that are used, which in turn may be dictated by the application and any constraints associated with such application.

Similarly, errors due to misalignment of the accelerometer may lead to inaccuracy and errors in the measurement or calculation of pitch and/or roll. Misalignment calibration accuracy, measured by accelerometer axis alignment, is therefore another useful metric for gauging the accuracy of the present invention. Typical accelerometer axis alignment (AAA) values for commercial grade IMU may be on the order of approximately 10,000 urad or 0.57°; typical AAA values for industrial grade IMU may be on the order of approximately 1,000 urad or 0.057°; typical AAA values for tactical grade IMU may be on the order of approximately 100 urad or 0.057°; and typical AAA values for navigation grade IMU may be on the order of approximately 50 urad or 0.0029°. Accordingly, it is preferable that the multi-IMU system exhibit an overall average accelerometer axis alignment (AAA) value of less than 10,000 urad or 0.57°. More preferably, the multi-IMU system exhibits an average AAA of less than 5,000 urad or 0.28°. Still more preferably, the multi-IMU system exhibits an average AAA of less than 1,000 urad or 0.057°. Yet more preferably, the multi-IMU system exhibits an average AAA of less than 500 urad or 0.028°. Even more preferably, the multi-IMU system exhibits an average AAA of less than 100 prad or 0.0057°. Still yet more preferably, the multi-IMU system exhibits an average AAA of less than 50 urad or 0.0029°. Again, the actual performance of the multi-IMU system may be dictated by the number of individual lower-grade IMUs that are used, which in turn may be dictated by the application and any constraints associated with such application.

Still another useful metric for measuring the accuracy of the multi-IMU system is the accelerometer scale factor which can lead to error errors in the measured orientation. Typical accelerometer scale factor error (ASFE) values for commercial grade IMU may be on the order of approximately 100,000 ppm; typical ASFE values for industrial grade IMU may be on the order of approximately 1,000 ppm; typical ASFE values for tactical grade IMU may be on the order of approximately 350 ppm; and typical ASFE values for navigation grade IMU may be on the order of approximately 100 ppm. Accordingly, it is preferable that the multi-IMU system exhibit an overall average accelerometer scale factor error (ASFE) value of less than 100,000 ppm. More preferably, the multi-IMU system exhibits an average ASFE of less than 10,000 ppm. Still more preferably, the multi-IMU system exhibits an average ASFE of less than 1,000 ppm. Yet more preferably, the multi-IMU system exhibits an average ASFE of less than 500 ppm. Even more preferably, the multi-IMU system exhibits an average ASFE of less than 250 ppm. Still yet more preferably, the multi-IMU system exhibits an average ASFE of less than 100 ppm. Again, the actual performance of the multi-IMU system may be dictated by the number of individual lower-grade IMUs that are used, which in turn may be dictated by the application and any constraints associated with such application.

Yet another useful metric for measuring the accuracy of the multi-IMU system is the gyroscope scale factor which can lead to error of the integration of angular rates during dynamic motion. Typical gyroscope scale factor error (GSFE) values for commercial grade IMU may be on the order of approximately 60,000 ppm; typical GSFE values for industrial grade IMU may be on the order of approximately 500 ppm; typical GSFE values for tactical grade IMU may be on the order of approximately 100 ppm; and typical GFE values for navigation grade IMU may be on the order of approximately 5 ppm. Accordingly, it is preferable that the multi-IMU system exhibit an overall average gyroscope scale factor error (GSFE) value of less than 60,000 ppm. More preferably, the multi-IMU system exhibits an average GSFE of less than 1,000 ppm. Still more preferably, the multi-IMU system exhibits an average GSFE of less than 500 ppm. Yet more preferably, the multi-IMU system exhibits an average GSFE of less than 250 ppm. Even more preferably, the multi-IMU system exhibits an average GSFE of less than 100 ppm. Still yet more preferably, the multi-IMU system exhibits an average ASFE of less than 100 ppm. Even still more preferably, the multi-IMU system exhibits an average ASFE of less than 50 ppm. Still even more preferably, the multi-IMU system exhibits an average ASFE of less than 10 ppm. Yet even more preferably, the multi-IMU system exhibits an average ASFE of less than 5 ppm. Again, the actual performance of the multi-IMU system may be dictated by the number of individual lower-grade IMUs that are used, which in turn may be dictated by the application and any constraints associated with such application.

Similar to accelerometers above, errors due to misalignment of the gyroscope may lead to inaccuracy and errors in the measurement or calculation of angular rate vector. Misalignment calibration accuracy, measured by gyroscope axis alignment, is therefore another useful metric for gauging the accuracy of the present invention. Typical gyroscope axis alignment (GAA) values for commercial grade IMU may be on the order of approximately 10,000 urad or 3.6°; typical GAA values for industrial grade IMU may be on the order of approximately 1,000 urad or 0.36°; typical GAA values for tactical grade IMU may be on the order of approximately 100 urad or 0.036°; and typical GAA values for navigation grade IMU may be on the order of approximately 5 urad or 0.0018°. Accordingly, it is preferable that the multi-IMU system exhibit an overall average gyroscope axis alignment (GAA) value of less than 10,000 urad or 3.6°. More preferably, the multi-IMU system exhibits an average GAA of less than 5,000 urad or 1.8°. Still more preferably, the multi-IMU system exhibits an average GAA of less than 1,000 urad or 0.36°. Yet more preferably, the multi-IMU system exhibits an average GAA of less than 500 prad or 0.18°. Even more preferably, the multi-IMU system exhibits an average GAA of less than 100 urad or 0.036°. Still yet more preferably, the multi-IMU system exhibits an average GAA of less than 50 urad or 0.018°. Even still more preferably, the multi-IMU system exhibits an average GAA of less than 5 urad or 0.0018°. Again, the actual performance of the multi-IMU system may be dictated by the number of individual lower-grade IMUs that are used, which in turn may be dictated by the application and any constraints associated with such application.

Virtually all embodiments of the present invention are directed to systems and methods of ensuring weapons safety inside a safety zone wherein it is absolutely undesirable for weapons to be able to be fired, launched, detonated, or otherwise engaged or employed. The safety zone is generally defines as a particular radius around the location (home position) from where the vehicle or projectile is launched, takes off, is fired, or is otherwise deployed, and includes the three-dimensional, cylindrical volume above and below the home position. Various sensors can be used alone or in combination to establish and define the safety zone, and to determine the vehicle's or projectile's position relative to the safety zone. Imaging sensors may identify unique landmarks and identifying characteristics that can be used to define the home location or boundaries around such home location. Thus, when the system detects that it is within the safety zone by identifying such landmarks, it disables all weapons systems such that they cannot be engaged or made ready under any circumstances. This helps to prevents any accidental weapons discharge near the home position, but more importantly, prevents malicious attacks from enemies who may seek to hijack the vehicle or projectile and return it to its home location to discharge the weapons. Thus, the sensors of the system are utilized to define the safety zone, and to determine the system's location such that it disables or disallows engagement of weapons systems when in the safety zone, and allows for weapons systems to be armed/fuzed/made ready when outside the safety zone.

The above is extended to create an autonomous or unmanned system safety supervisor for systems armed with lethal, less than lethal, and electronic warfare systems. In the past, human being was the last step to pull the trigger or release the weapon systems, but now placing these weapons on the unmanned system puts a radio link in the loop of the deployment of weapons. This invention creates a safety supervisor that protects the system from 3 types of dangerous failure modes; 1) A confused or misinformed friendly fire incident, 2) a hijacked system from being tasked to attack the system's rightful controller 3) insider threat sabotage on friendly personnel or assets. To solve this problem the low cost high performance IMU technologies are combined with low cost sensors to create safety zones and safety focused features in the landscape that can force unmanned systems to return to a safe state when certain conditions are met. This safety supervisor is in addition to the independent safety systems that must be in each weapon or weapon system attached to the unmanned system. This approach of having a safety supervisor for all armed unmanned systems (aerial, ground, and underwater) for lethal, less than lethal, and electronic warfare payloads will provide an effective path forward for moving more users out of reach of the adversary in a safe manner.

To improve the quality of the safety zone generation and detection, an array of small low power sensors is envisioned to be added to the IMUs described above. Particular sensors of interest are visible spectrum image sensors such as visual cameras or visual video cameras, Infrared Video cameras (particularly Long wave infrared (LWIR) video cameras), thermal image sensors, mm Wave Radars (ideally of the 60 GHz, 77 Ghz, or 24 Ghz Bands), pressure sensors, and an RF Beacon interface. All these sensors would be arrayed on the unmanned platform to observe the environment around and below the system. During the takeoff phase, all the sensors would establish baseline data that would establish the home position that the primary safety zone is constructed around. This would include images, heat signatures, topographic data, and other multi or hyper spectral combinations of the above. These arrays of sensors are able to be registered to each other increasing the data quality so that specific regions for each sensor input can be correlated to the appropriate regions on another sensor. To increase the throughput and the quality of the sensor data products, the IMU data is used in the transformation of the video and radar data streams into an earth fixed reference frame. The IMUs provide excellent high resolution detail of the dynamics of the system but can drift over the longer mission times. The video and radar sensors do not drift but do not have as fine of time resolution. In combination these sensors and IMUs produce better navigation data.

For the video cameras the system can create optical flow paths to create breadcrumbs of where the system has gone. This process can be performed with traditional CPUs or can be accelerated with machine learning methods, including neural networks implemented on TPUs, VPUs and/or GPUs. These can aid in the generation of waypoints through perceiving the scene. There are 4 classes of environmental detection and tracking that will facilitate this safety zone: 1) detecting and marking the home safety zone, 2) detecting and marking the path traveled, 3) detecting and marking specific high contrast/high fidelity landmarks along the path, and 4) general scene detection such as horizon detection.

For the Infrared video cameras all of the same methods described above apply either on their own or in combination with the visual camera to increase the performance.

For the Radar, using it as a radar altimeter provides one useful input, but implementing a beam steering method allows the system to rapidly scan the landscape to make distance and velocity measurements of an array of points. These depth and velocity measurements can be combined with the video data to increase detection and reliability. In combination with the IMU data and camera date the system can build a topographic map of the landscape below for better defining safety zones, safety paths, and safety features. The radar provides effective uses even in poor weather conditions (darkness, rain, fog)

For underwater applications a sonar is substituted for the RADAR as a navigation and detection tool for creating safety zones. In utilizing the Steerable beamforming radar described above for measuring velocities and distances, the same hardware set can be used to create a high bandwidth datalink that can provide distances traveled and Angle of Arrival of the RF signal for use as a safety or navigation feature. By placing a beacon (which is a beamforming radar itself) at the takeoff point, this provides an additional safety feature as the system can measure distance and orientation to home. By placing beacons (dropping them from the UAS for instance) along the path, they can provide safety features and navigation aides to return home safe. These beacons can be used as a template for subsequent UAVs to travel the same path or operate in the same area. The beacons can also be used to relay safety data if the flight control data link is compromised or degraded.

Another unique aspect of this technology is that it can accomplish an additional objective with the hardware required for the system safety supervisor described above. That additional objective is one of navigation in GPS denied and degraded environments. Just as the system safety supervisor needs to 1) detect and mark its home, 2) detect and mark its path of travel, 3) detect and mark high contrast points along the path, and 4) generally perceive and track its environment in order to safely supervise the weapon systems, the unmanned system needs to navigate in the GPS denied environment. In essence by solving either the safety supervisor or navigation problem you get the solution to both. By tracking the landscape with multi and hyperspectral low cost sensors, the system can navigate in degraded GPS and degraded weather environments. The beacons can be used as markers along the path and as triangulation tools to navigate in heavy fog. It also provides a secure redundant communication network. Setting such beacons or defining waypoints along the route of travel allows the system to further provide navigation and guidance in circumstances where traditional systems, like GPS for example, are unavailable or unreliable. The system, in many embodiments, may define particular points of interest in the various types of image data collected, and those points of interest can be defined as waypoints that are identifiable and recognizable features in the image data. The system can then integrate and fuse sensor data in order to calculate the relative distance between the vehicle and a particular point of interest or waypoint, the distance between such points, or any other combination of distances that are tied to objects in the system or in the data acquired by the system sensors. For example, a pixel to position system may preferably be employed where a point of interest in image data is defined and identified in the image data as, for example, Waypoint A. The, in that image data, the number of pixels can be counted between another reference point or object and Waypoint A, and along with the altimeter data that provides the UAV's altitude, the system can interpret the pixels in relation to actual measurements of distance and calculate the distance to Waypoint A. Thus, as points of interest, waypoints, and beacons are identified or created as the vehicle travels out toward a potential target site, these points are stored and become known to the system as absolute positions. Then, after performing it's duties at the potential target site, the vehicle may return home, or to another predefined rally point, using the points of interest, waypoints, and beacons as guidance and navigation beacons which it searched for and travels toward along the return path. All this is possible without the use of GPS, and provides a real time navigation and control solution for GPS denied, degraded, jammed, or spoofed environments.

Another means to extend this method is for multiple unmanned systems to share safety supervisor or navigation data. That is one unmanned system can map out the environment and lay beacons for any number of collaborating unmanned or manned systems. By having multiple captures of the environment increased resilience to poor weather and lighting conditions can be achieved.

Another means to extend this effort is to improve the cyber security of each piece of the communication system through the use of embedded HSMs (hardware security monitors) and/or TPMs (trusted platform modules) to ensure that only authorized systems are able to decipher or communicate on the network built by collaborating unmanned systems and the beacons that they deploy. In the architecture where there are static beacons on the ground and beacons attached to collaborating unamended aerial and ground vehicles the overall resilience of the navigation and safety supervision data is improved. In one implementation a specific unit can define hardware based security keys through direct handshakes so that no unmanned systems or beacons can enter the local network without the hardware handshake at the beginning. This extends zero trust cyber security principles into the embedded hardware of this new safety supervisor and navigation technology.

To extend the use case of the hardware described above, the use case of a dual purpose mm Wave transceiver is discussed. This ability to use a mm Wave transceiver as both a ranging and detection tool (in either FMCW or ToF mode) as well as a communication link maximizes the benefit of its inclusion in the safety supervisor and/or navigation system. The mmwave frequencies enable the use of small antenna arrays to steer the receive and transmit functions of the transceiver. This provides 3 benefits; it extends the range of the system for ranging and communication, it prevents unauthorized parties from detecting the signal, and it provides angle of arrival data to improve safety supervision and navigation.

Another important aspect of the present invention is a dual-function usage of radio, particularly radar or sonar, sensors, depending on the embodiment. Such sensors/radios, in the scope of the present invention, may preferably be used not only for acquiring data regarding the surroundings and environment of the vehicle or projectile, but also for communication between the vehicle or projectile and the home position, or at least one or more beacons, waypoints, or communication stations along the path from the home position to the vehicle's or projectile's current location. Any such beacons, waypoints, or communication states that are dropped can be used as "breadcrumbs" by which the system can chart a return path to the home position in stages, following the beacons and without requiring long-range signals, which can be more easily located, intercepted, spoofed, etc. Thus, in the example of radar, not only can the radar systems be used for altitude, velocity, terrain measurement, and the like, but such radios can also be used to communicate with the beacons that are dropped for location, guidance, and navigation purposes. Proper encryption and security measures can be employed between each radar antenna or point, and each point can only be activated when pinged for communication from another point thus preventing the use of broad, sweeping transmissions that can easily be detected, intercepted, and located. This chain of secure communication hubs allows for the vehicle or projectile to be in substantially constant secure communication with the home base. It also creates a network of communication points that be accessed by subsequent vehicles or projectiles that may be desired to travel to the same destination for varying purposes.

Now referring to the figures and drawings, FIG. 1 is a schematic diagram depicting an exemplary embodiment of the present invention wherein multiple IMUs 105 are configured on a single printed circuit board 100. The y- and z-axis are those perpendicular to each other along each surface of the board, and the x-axis is that which is perpendicular to the surface of the board, and extends through the board. Individual low-grade IMUs 105 are mounted on the board 100 in any number of combinations as disclosed here, and are preferably mounted in different orientations with respect to the y- and z-axes of the board. The figure depicts pin markers 110 on the individual IMUs 105 indicating a reference point on the IMUs 105, and show that they are each mounted in a different orientation. The depicted embodiment comprises thirty-two (32) individual low-grade IMUs—sixteen (16) on each side (i.e., sixteen on the top side as shown, and sixteen additional on the reverse or bottom side of the board, not shown), and four (4) each in a quadrant of each surface of the board. The difference in orientation of IMUs is specific to each grouping of 4 IMUs on a quadrant. Thus, each quadrant comprises 4 IMUs in different orientations, although IMUs on different quadrants may be of the same orientation. This configuration allows the system to calibrate the individual IMUs with respect to each other as well as to provide redundant measurements that allow for calibration assistance, error checking and overall increased accuracy.

Figure 2:
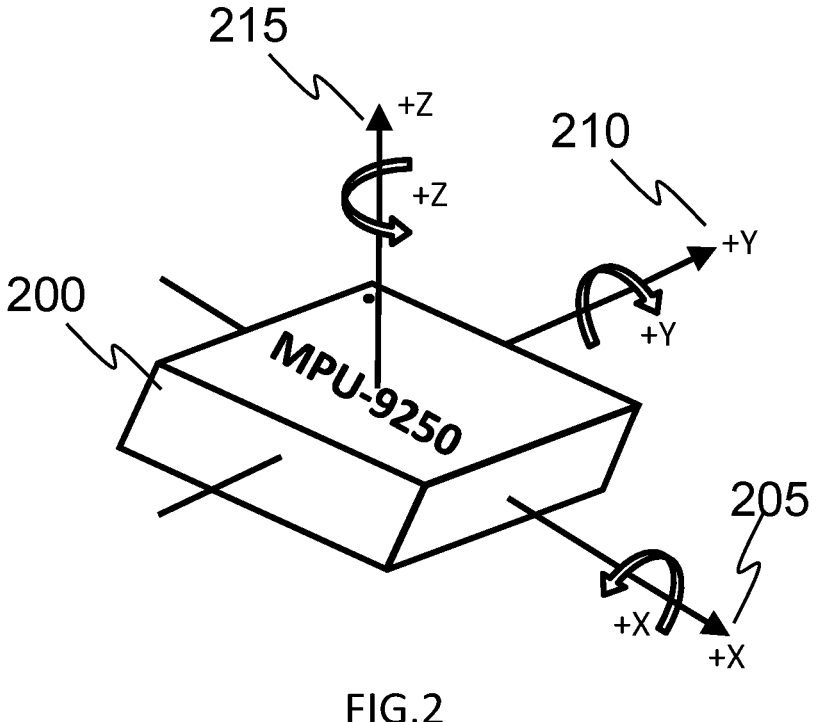
FIG. 2. Diagram depicting the orientation of the axes of sensitivity and the polarity of rotation for the accelerometer and gyroscope of a low-resolution IMU.

FIG. 2 is a diagram depicting the orientation of axes of sensitivity and the polarity of rotation for the accelerometer and gyroscope of an individual low-end or low-resolution IMU of the present invention. The multi-IMU, in many embodiments, preferably includes a plurality of the IMUs, a single such IMU 200 depicted in the present figure. Each individual IMU 200 in the multi-IMU system is preferably interconnected with the others, at least via firmware, and are arranged in any number of patterns on the upper or lover surface of a PCB, for example as shown in FIG. 1. The system preferably includes at least one processor (not shown) comprising one or more algorithms (not shown) adapted to receive and integrate data from the individual IMUs 200 in order to produce a unified guidance output and/or guidance metric that is a much more accurate and precise measurement than any of the individual IMUs 200 could provide on its own. The system also preferably calibrates the individual IMUs 200 based on their relative location and orientation to each other and their absolute position and location on the PCB (not shown) within the multi-IMU system. Preferably, one or more of the individual IMUs 200 are oriented on the PCB (not shown) in different orientation with respect to the depicted axes 205, 210, 215. Differing orientations enable the system to perform its calibration for the individual IMUs 200 with respect to each other and thus the multi-IMU system as a whole. Once calibrated, the individual IMUs 200 provide a series of redundant measurements that serve to provide accurate data and measurements in each axis 205, 210, 215, and can be integrated to yield a much more high resolution system than any individual IMU 200 is capable of on its own. The system also preferably is adapted to select various groups or subgroups of individual IMUs 200 based on their individual or collective specifications to operate under certain conditions, the groups or subgroups chosen preferably include a number of individual IMUs 200 that are differently positioned on the PCB (not shown) and differently oriented with respect to their axes 205, 210, 215 to ensure the calibration and redundancy capabilities even when operating in smaller groups. When the conditions change, the system preferably provides a handshake, via a handshake algorithm, in order to select a different group or subgroup of individual IMUs 200 that is better suited to operate under the new conditions. For example, under harsh conditions with a large range of variability, a high dynamic range-low resolution group of IMUs 200 can be selected, but when conditions are relatively stable a lower dynamic range-higher resolution group can be used.

Figure 3:
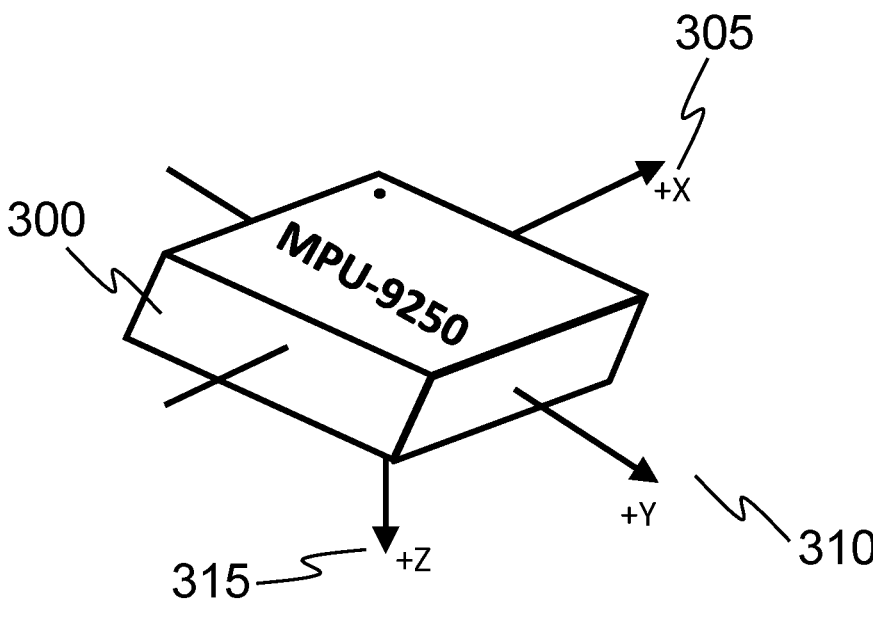
FIG. 3. Diagram depicting the orientation of the axes of sensitivity for a compass of a low-resolution IMU.

FIG. 3. is a diagram depicting the orientation of the axes 305, 310, 315 of sensitivity for an optional compass (internal, not shown) of an individual low-end or low-resolution IMU 300 of the present invention. The optional compass (internal, not shown) can help compensate for shift and/or bias in the other sensor(s) (internal, not shown) and provides an absolute frame of reference for the other sensor(s) (internal, not shown) present on the individual IMU, and thus aides in calibration of the individual IMU and more importantly the multi-IMU system.

Figures 4A, 4B, 4C, 4D:
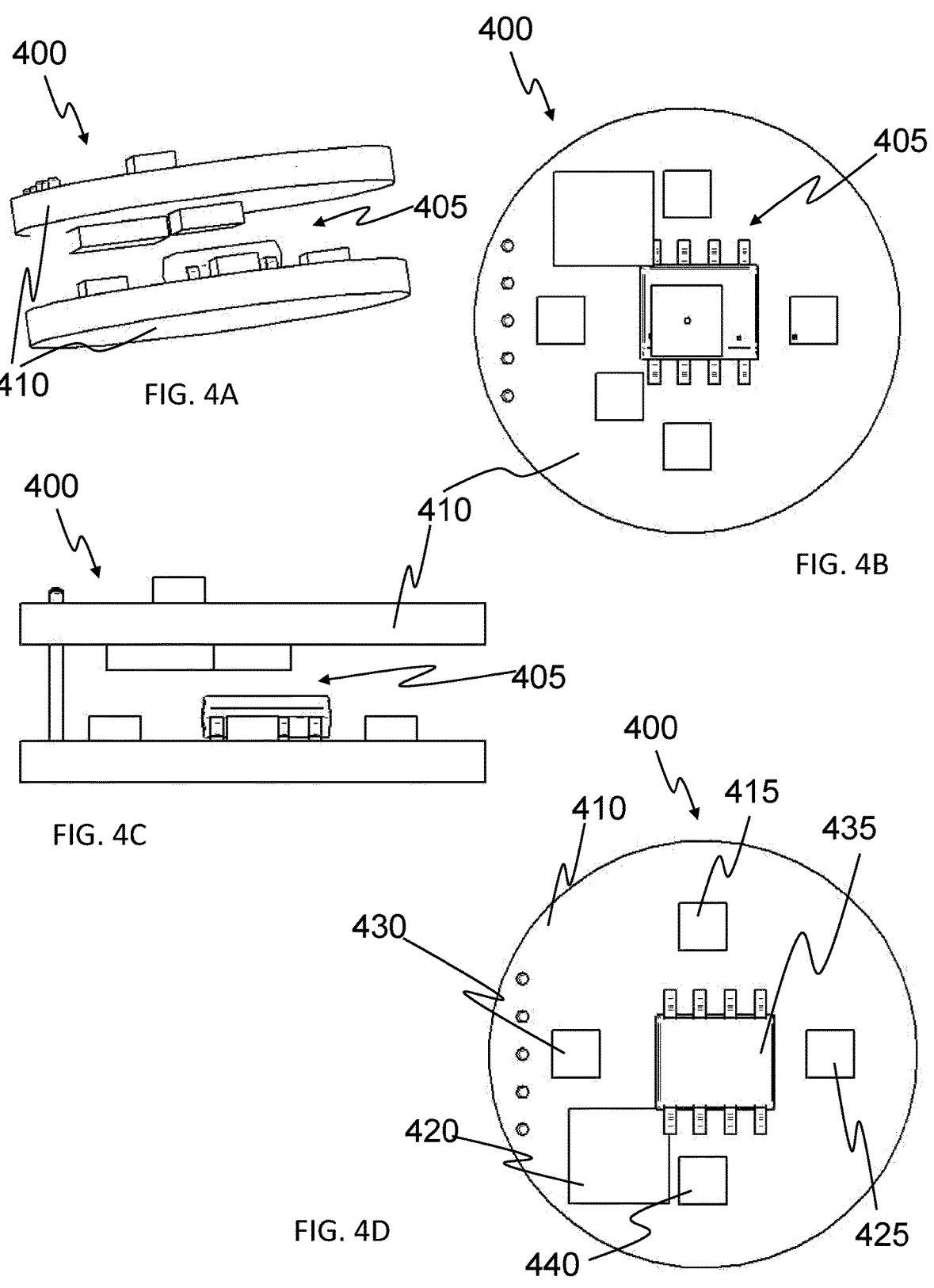
FIGS. 4A-D. Several views of one embodiment of an individual low-end IMU on a circuit board depicting various sensors, such views including A) perspective view, B) circuit diagram, C) side view, and D) top view.

FIGS. 4A-D include several views of one embodiment of an individual low-end IMU of the present invention depicting various sensors, such views including A) perspective view, B) top view, C) side view, and D) alternative embodiment top view. FIG. 4A depicts a perspective view of an individual low-end IMU 400. The IMU 400 comprises a plurality of sensors 405 mounted on to a surface of a PCB 410. The plurality of sensors 405 may include any number and variety of the sensors discussed herein or known in the art, but preferably at least one accelerometer is present. FIG. 4B depicts a top view of one embodiment of an individual low-end IMU 400 comprising a PCB 410 and a plurality of sensors 405. The plurality of sensors 405 are shown in an arrangement with multiple sensors located at different radii from the center of the PCB. Different individual IMUs 400 comprising a multi-IMU (not shown) will preferably comprise he plurality of sensors 405 oriented and arranged in different locations on the PCB in order to provide redundant measurements for calibration purposes and for error check in measurements between IMUs 400. FIG. 4C is a side view depiction of the individual low-end IMU comprising a plurality of sensors 405 mounted on one or more PCBs 410. FIG. 4D s depicts a top view of an alternative embodiment to that depicted in FIG. 4B, with a plurality of sensors mounted in different locations and orientations on the PCB 410. In the present embodiment, the IMU 400 includes a gyroscope 415, an accelerometer 420, a magnetometer 425, a processor or microprocessor 430, an integrated sensor suite 435 comprising one or more sensors (e.g., accelerometer, gyroscope, magnetometer, and the like), and a compass 440. This embodiment serves to show the numerous types of sensors and components that can be comprised on a single IMU, and when compared with FIGS. 4A-4c, depicts varying positioning and orientation of the sensors on the PCB 410. The separate integrated sensor suite 435 is a standalone unit that adds redundant sensors to the IMU 400 and preferably includes at least one or more of an accelerometer, gyroscope, magnetometer and processor or microprocessor. In the present invention, a number of these IMUs 400 are coupled together and together form a multi-IMU system as described herein.

Figure 5:
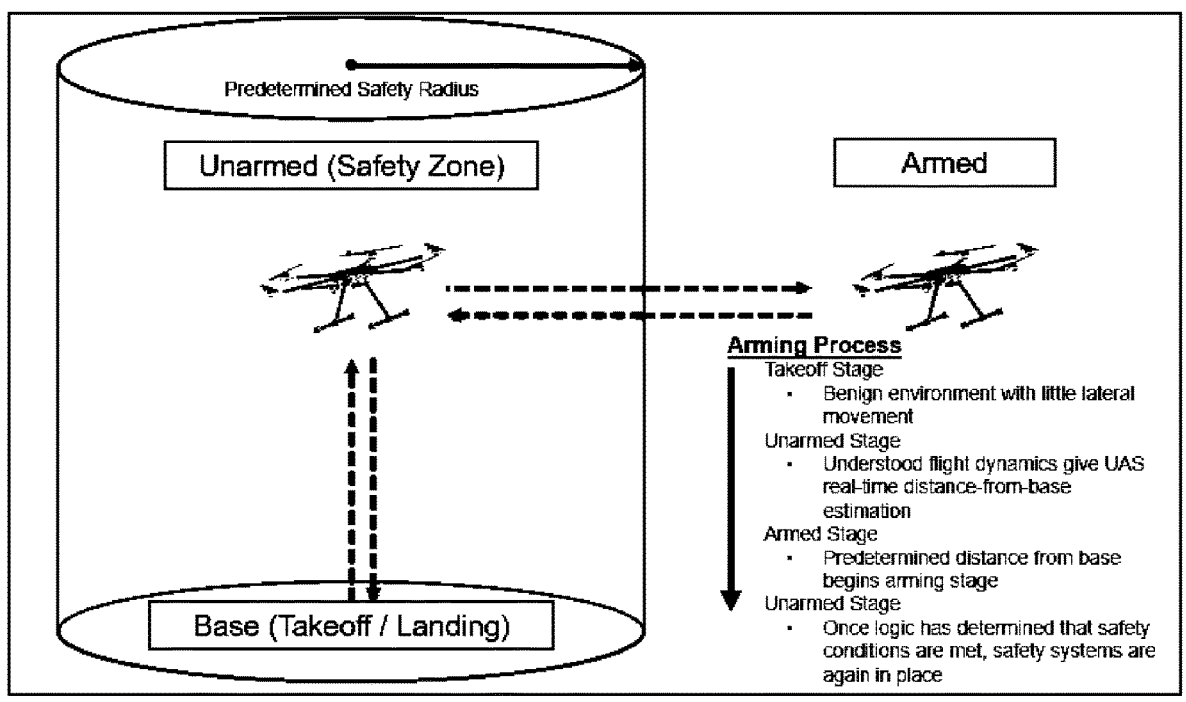
FIG. 5. Diagram depicting progression of the vehicle or projectile through stages of armed and unarmed, or safe and armed travel.

FIG. 5 is a depiction of the flight stages of a vehicle or projectile in the context of the present invention, and specifically in relation to the safety supervisor element of the invention and the safety zone generated for preventing arming and fuzing of the weapons until it is deemed safe to do so. Effectively, the system breaks a mission into 5 separate stages including 1) takeoff; 2) unarmed travel; 3) armed ("armable") travel; 4) unarmed travel; and 5) landing. The takeoff stage involves the launching or other such deployment of the vehicle or projectile, and can be presumed as taking place in a location desired to be kept safe from the weapons of the vehicle or projectile. The initial safety zone can be predefined in terms of radius or based on landmarks, points of interest, or other sensor recordings acquired during initialization and/or calibration of the vehicle. For the predominant UAV embodiments, takeoff can generally be assumed to be taking place in a benign environment and to consist of a very high ratio of vertical to horizontal movement, i.e., the vehicle generally will travel vertically to a desired flight altitude while travelling very little in any horizontal direction, though may perform elliptical movements for sensor calibration and orientation. Takeoff leads to the early stages of unarmed flight, which take place within the safety zone—the imaginary cylindrical area surrounding the launch point. During this stage, the system disables all fuzing and arming capabilities of the weapons system. The sensor recordings and known flight dynamics provide the vehicle with real-time data related to the distance-from-base or home, as well as acquisition of data related to points of interest, horizon, waypoints, and potential targets that may be identified. Once the vehicle or projectile exits the safety zone, the arming and fuzing become available, and the system can do so at any point pursuant to any arming conditions that are defined or pertinent to the instant mission. The stage of exiting the safety zone and entering the arming zone is generally defined by travelling beyond a predefined radius, but as with all definitions, may be provided by any set of conditions or sensor recordings that are desirable (e.g., reaching a particular altitude combined with travelling a defined distance and/or speed, or detecting a predefined point of interest or waypoint). Whether or not the weapons systems are deployed or fired on a particular flight or mission, the vehicle may eventually return back toward the home point. It may be desirable for the vehicle to set down or stop travelling at a neutral location, separate from the home location, in order to help prevent the enemy from following the return path and discovering the location of the home point. As the vehicle returns back toward the launch point, or another identified point of safe landing, it may follow the return path following the breadcrumbs identified and collected in the form of waypoints or points of interest recording by the sensors and system during flight. Further, it may utilize those waypoints and points of interest to help identify if/when it may reenter the original safety zone, or enters a new safety zone. Once the identification has been made that it is in such a safety zone, it operates to disable all fuzing/arming capabilities, and ultimately the vehicle lands at the designated landing site.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

The invention claimed:

1. A guidance, navigation and weapons fuzing system comprising:

an unmanned aerial vehicle (UAV) comprising at least one visible spectrum image sensor adapted for acquiring visible image data, at least one infrared (IR) image sensor adapted for acquiring infrared image data, and at least one altimeter adapted for measuring altitude data of the UAV;

at least one processor comprised on the UAV and adapted to:

a. receive the visible image data, IR image data, and altitude data, b. process the visible and IR image data to identify and acquire one or more points of interest and define waypoints based on the points of interest, points of interest being identifiable and recognizable features in the visible image data and/or infrared image data, and waypoints being points of interest selected to be used in guidance and navigation of the UAV), c. identify and measure relative distances:

i. between the UAV and points of interest, ii. between the UAV and waypoints, and iii. between the waypoints, d. to determine the UAV's location relative to one or more predefined safe zones, and e. to provide guidance and control commands to the UAV based on the image data, altitude data, and processed data;

a transceiver comprised on the UAV and adapted for transmitting at least one or more of the image data types to a second processor at a remote location, and the transceiver is adapted to be off, and not transmitting any data, during flight from takeoff to a target location and during flight from the target location to a home location or a rally point; and an arming and fuzing subsystem comprised on the processor and/or the second processor and adapted to arm and fuze a weapon system based on an arming determination that the UAV is outside of the one or more safe zones and with confirmation from a remote user, the arming determination based on the determination of the UAV's location relative to the one or more predefined safe zones and the weapon system comprising a projectile or munition releasable from a UAV, wherein the predefined safe zones are areas or regions designated and preprogrammed into the UAV in which the arming and fuzing subsystem is completely unable to arm and fuze the weapon system.

2. The system of claim 1, further comprising a thermal imaging sensor adapted for acquiring thermal image data, and the processor is further adapted to receive the thermal image data and include the thermal image data in its processing, identifications, and determinations.

3. The system of claim 2, wherein the processor is further adapted to determine the distances by identifying at least one of the points of interest or waypoints in the image data and calculating the distance to a pixel in the image data corresponding to a given point of interest or waypoint based on the image data and the altitude data.

4. The system of claim 3, wherein the at least one processor is further adapted to guide the UAV back toward the home location or the rally point based on identifications of the points of interest in reverse order based on the image data and altitude data.

5. The system of claim 4, wherein the rally point is a safe zone different from the home location and is selected as a safe zone to land the UAV for later retrieval.

6. The system of claim 5, wherein the UAV further comprises at least one inertial measurement unit (IMU) comprising at least one accelerometer, at least one gyroscope, and at least one magnetometer.

7. The system of claim 6, wherein the at least one IMU is adapted to provide in-flight data, and the at least one processor is further adapted to recalibrate one or more of the visible spectrum image sensor, at least one infrared (IR) image sensor, and at least one altimeter.

8. The system of claim 7, wherein the image data transmitted by the transceiver is adapted to be used for target identification and selection for the user to deploy the weapons system.

9. The system of claim 8, wherein the system is adapted to deploy all weapons or rounds of the weapon system and cannot enter a safety zone with undeployed weapons or rounds.

10. An unmanned aerial vehicle (UAV) system with guidance, navigation and weapons fuzing system comprising:

a sensor subsystem comprising at least one visible spectrum image sensor adapted for acquiring visible image data, at least one infrared (IR) image sensor adapted for acquiring infrared image data, and at least one altimeter adapted for measuring altitude data of the UAV;

at least one processor comprised on the UAV and adapted to:

f. receive the visible image data, IR image data, and altitude data, g. process the visible and IR image data to identify and acquire one or more points of interest and define waypoints based on the points of interest, points of interest being identifiable and recognizable features in the visible image data and/or infrared image data, and waypoints being points of interest selected to be used in guidance and navigation of the UAV), h. identify and measure relative distances:
i. between the UAV and points of interest,
ii. between the UAV and waypoints, and
iii. between the waypoints, i. to determine the UAV's location relative to one or more predefined safe zones, j. to provide guidance and control commands to the UAV based on the image data, altitude data, and processed data, and k. determine the distances by identifying at least one of the points of interest or waypoints in the image data and calculating the distance to a pixel in the image data corresponding to a given point of interest or waypoint based on the image data and the altitude data; and a transceiver comprised on the UAV and adapted for transmitting at least one or more of the image data types to a second processor at a remote location, and the transceiver is adapted to be off, and not transmitting any data, during flight from takeoff to a target location and during flight from the target location to a home location or a rally point, wherein the predefined safe zones are areas or regions designated and preprogrammed into the UAV in which the arming and fuzing subsystem is completely unable to arm and fuze the weapon system.

11. The system of claim 10, further comprising a thermal imaging sensor adapted for acquiring thermal image data, and the processor is further adapted to receive the thermal image data and include the thermal image data in in its processing, identifications, and determinations.

12. The system of claim 11, further comprising an arming and fuzing subsystem comprised on the processor and/or the second processor and adapted to arm and fuze a weapon system based on an arming determination that the UAV is outside of the one or more safe zones, the arming determination based on the determination of the UAV's location relative to the one or more predefined safe zones and with confirmation from a remote user, and the weapon system comprising a projectile or munition releasable from a UAV.

13. The system of claim 12, wherein the at least one processor is further adapted to guide the UAV back toward the home location or the rally point based on identifications of the points of interest in reverse order based on the image data and altitude data.

14. The system of claim 13, wherein the rally point is a safe zone different from the home location and is selected as a safe zone to land the UAV for later retrieval.

15. The system of claim 14, wherein the UAV further comprises at least one inertial measurement unit (IMU) comprising at least one accelerometer, at least one gyroscope, and at least one magnetometer.

16. The system of claim 15, wherein the at least one IMU is adapted to provide in-flight data, and the at least one processor is further adapted to recalibrate one or more of the visible spectrum image sensor, at least one infrared (IR) image sensor, and at least one altimeter.

17. The system of claim 16, wherein the image data transmitted by the transceiver is adapted to be used for target identification and selection for the user to deploy the weapons system.

18. The system of claim 17, wherein the system is adapted to deploy all weapons or rounds of the weapon system and cannot enter a safety zone with undeployed weapons or rounds.

* * * * *